United States Patent [19]
Ben-Meir et al.

[11] Patent Number: 5,826,073
[45] Date of Patent: Oct. 20, 1998

[54] SELF-MODIFYING CODE HANDLING SYSTEM

[75] Inventors: Amos Ben-Meir, Cupertino; John G. Favor, San Jose, both of Calif.

[73] Assignee: Advanced Micro Devices, Inc., Sunnyvale, Calif.

[21] Appl. No.: 592,150

[22] Filed: Jan. 26, 1996

Related U.S. Application Data

[60] Provisional application No. 60/005,069 Oct. 6, 1995 and provisional application No. 60/005,021 Oct. 10, 1995.

[51] Int. Cl.[6] .................................................... G06F 9/00
[52] U.S. Cl. ............................................................ 395/567
[58] Field of Search ........................ 364/DIG. 1, DIG. 2; 395/200.3, 200.51, 200.53, 200.74, 376, 567, 800.01, 800.17, 800.36; 711/113, 114, 118, 123

[56] References Cited

U.S. PATENT DOCUMENTS

| 5,226,130 | 7/1993 | Favor et al. | 395/375 |
| 5,434,987 | 7/1995 | Abramson et al. | 395/567 |
| 5,692,167 | 11/1997 | Grochowski et al. | 395/567 |

FOREIGN PATENT DOCUMENTS 0 159 712  10/1985  European Pat. Off. .

OTHER PUBLICATIONS

Anderson, et al.: "Instruction prefetching interlock", Jul. 1967, pp. 125–126, IBM Technical Disclosure Bulletin, XP000615113.

*Primary Examiner*—Robert B. Harrell
*Attorney, Agent, or Firm*—Skjerven, Morrill, MacPherson, Franklin, Friel LLP; David W. O'Brien

[57] ABSTRACT

A processor which includes tags indicating memory addresses for instructions advancing through pipeline stages of the processor and which includes an instruction decoder having a store target address buffer allows a self-modifying code handling system to detect store operations writing into the instruction stream and trigger a self-modifying code fault. In one embodiment of a self-modifying code handling system, a store pipe is coupled to a data cache to commit results of a store operation to a memory subsystem. The store pipe supplies a store operation target address indication on commitment of a store operation result. A scheduler includes ordered Op entries for Ops decoded from instructions and includes corresponding first address tags covering memory addresses for the instructions. First comparison logic is coupled to the store pipe and to the first address tags to trigger self-modifying code fault handling means in response to a match between the store operation target address and one of the first address tags. An instruction decoder is coupled between the instruction cache and the scheduler. The instruction decoder includes instruction buffer entries and second address tags associated with the instruction buffer entries. Second comparison logic is coupled to the store pipe and to the second address tags to trigger the self-modifying code fault handling means in response to a match between the store operation target address and one of the second address tags.

82 Claims, 7 Drawing Sheets

SELF-MODIFYING CODE HANDLING SYSTEM

This application claims benefit of U.S. Provisional application Ser. No. 60/005,069, filed Oct. 6, 1995 and U.S. Provisional application Ser. No. 60/005,021, filed Oct. 10, 1995.

BACKGROUND OF THE INVENTION

1. Field of the Invention

The invention relates to processors, and in particular to a system for handling self-modifying code in a pipelined processor.

2. Description of the Related Art

Computer programs are typically designed, coded, and compiled with a simplifying assumption that the resulting object code will be executed in sequential order. However, despite this assumption, modern processor design techniques seek to exploit opportunities for concurrent execution of machine instructions, i.e., instruction parallelism. To maximize computational throughput, pipelining techniques can be used to map instruction parallelism to multiple stages of a single functional unit or execution path. In contrast, superscalar techniques, which include out-of-order instruction issue, out-of-order instruction completion, and speculative execution of instructions, map instruction parallelism to multiple functional units or execution paths. Modern processor designs often exploit both pipelining and superscalar techniques.

Out-of-order instruction issue involves the issuance of instructions to execution units with little regard for the actual order of instructions in executing code. A superscalar processor which exploits out-of-order issue need only be constrained by dependencies between the output (results) of a given instruction and the inputs (operands) of subsequent instructions in formulating its instruction dispatch sequence. Out-of-order completion, on the other hand, is a technique which allows a given instruction to complete (e.g. store its result) prior to the completion of an instruction which precedes it in the program sequence. Finally, speculative execution involves the execution of an instruction sequence based on predicted outcomes (e.g., of a branch) and allows a processor to execute instructions without waiting for branch conditions to actually be evaluated. Assuming that branches are predicted correctly more often than not, and assuming that a reasonable efficient method of undoing the results of an incorrect prediction is available, the instruction parallelism (i.e., the number of instructions available for parallel execution) will typically be increased by speculative execution (see Johnson, Superscalar Processor Design, Prentice-Hall, Inc., New Jersey, 1991, pp. 63–77 for an analysis).

Superscalar techniques largely concern processor organization independent of instruction set and other architectural features. Thus, one of the attractions of superscalar techniques is the possibility of developing a processor that is code compatible with an existing processor architecture, for example the x86 processor architecture. Many superscalar techniques apply equally well to either RISC or CISC architectures. However, because of the regularity of many of the RISC architectures, superscalar techniques have initially been applied to RISC processor designs. In particular, the three operand load/store architecture, fixed instruction lengths, limited addressing modes, and fixed-width registers associated with a RISC architecture and instruction set facilitate the single cycle decoding of multiple instructions necessary to consistently supply multiple execution units with work.

One approach to developing a superscalar processor that is code compatible with an x86 architecture has been to dynamically translate x86 instructions into RISC instructions, or operations, which may then be executed by a RISC core or execution engine. Techniques for designing such a superscalar RISC processor are described in Johnson, Superscalar Processor Design.

Executing instructions out of sequential order, i.e., issuing and completing instructions out of sequential order, can increase a superscalar processor's performance by allowing the superscalar processor to keep multiple execution units operating in parallel and thereby improve throughput. Accordingly, a scheduler for a superscalar processor can improve overall performance by determining which instructions can be executed out-of-order and providing, or dispatching, those instructions to appropriate execution units. A scheduler for a superscalar processor must also handle interrupts and traps. Many processor architectures, including the x86 processor architecture, require that an architectural state be known just before or after an instruction generates an error, interrupt, or trap. This presents a difficulty when instructions are executed out of sequential order. Therefore, the scheduler must be able to undo instructions and reconstruct the system's state as if instructions executed in sequential order.

Self-modifying code represents a further complication. In the case of certain architectures, including those conforming to the x86 processor architecture, one part of an executing program may modify other parts of the same program. The modified instruction sequence parts may then executed.

For certain CISC architectures which allow programs to modify itself, including the x86 processor architecture, this type of questionable programming practice has become established within a relevant portion of the existing software base. As a result, to maintain compatibility, new processor implementations often must not only implement the direct semantics of the architecture's instructions set, but also maintain expected secondary semantic behavior. In the case of high performance pipelined, superscalar implementations, this can become a significant, and potentially difficult, requirement to satisfy.

To the extent that instructions are fetched from the memory subsystem after a store into the instruction stream has completed, there is no problem. However, if unmodified representations of an instruction exist within the various pipeline stages or functional units of a pipelined superscalar processor, consistency problems exist. The maintenance of consistency must encompass not only conventional data/instruction cache consistency, but also consistency with respect to memory store instructions modifying other instructions which are executed shortly thereafter.

The consistency problem is similar to that encountered with more conventional data/instruction cache structures used in high-performance processors where memory writes must be appropriately reflected in the state and/or contents of any affected cache entry. However, the scope of the self-modifying code problem is more severe. In extreme "store-into-instruction-stream" cases, a modifying instruction may be immediately followed by a branch and then a modified target instruction. Particularly for highly pipelined, high-performance processor designs, guaranteeing an execution path identical to that of an architectural standard processor (such as the x86 processor) can prove difficult and expensive in terms of additional hardware circuitry and design complexity.

Pipelining, particularly the deep pipelining that is common in high-performance implementations of CISC architectures, results in large instruction processing latencies and high degrees of overlap between the processing of successive instructions. On the other hand, the execution of a memory write generally takes place late in such pipelines. Consequently, actions such as fetching instructions from memory or cache and speculatively dispatching instructions to execution pipelines can easily occur before the completion of a memory write which precedes the fetched or dispatched instruction in the execution sequence.

SUMMARY OF THE INVENTION

It has been discovered that a processor which includes tags indicating memory addresses for instructions advancing through pipeline stages of the processor and which includes an instruction decoder having a store target address buffer allows self-modifying code support logic to detect store operations writing into the instruction stream and trigger a self-modifying code fault.

In one embodiment of the present invention, a self-modifying code handling system for a computer having operation entries for representing operations in stages from instruction fetch to result commitment and having a store pipe for committing store operands to target addresses in memory, includes first tag stores, first comparison logic, and control logic. The first tag stores are respectively associated with a first group of the operation entries and represent first addresses in memory of instructions corresponding to the associated operation entries. The first comparison logic is coupled to the first tag stores and to the store pipe. The first comparison logic supplies a self-modifying code indication in response to a match between the target address for a store operation committed by the store pipe and any of the first addresses represented in the first tag stores. The control logic is coupled to the first comparison logic and to the operation entries. The control logic flushes uncommitted ones of the operation entries in response to the self-modifying code indication.

In another embodiment of the present invention, an apparatus includes a memory subsystem, instruction and data caches coupled to the memory subsystem, execution units, a scheduler, first and second comparison logic, and an instruction decoder. One of the execution units includes a store pipe coupled to the data cache to commit results of a StOp to the memory subsystem. The store pipe supplies a StOp target address indication on commitment of a StOp result. The scheduler includes ordered Op entries for Ops decoded from instructions and includes corresponding first address tags covering memory addresses for the instructions. The first comparison logic is coupled to the store pipe and to the first address tags to trigger self-modifying code fault handling means in response to a match between the StOp target address and one of the first address tags. The instruction decoder is coupled between the instruction cache and the scheduler. The instruction decoder includes instruction buffer entries and second address tags associated with the instruction buffer entries. The second comparison logic is coupled to the store pipe and to the second address tags to trigger the self-modifying code fault handling means in response to a match between the StOp target address and one of the second address tags.

BRIEF DESCRIPTION OF THE DRAWINGS

The present invention may be better understood, and its numerous objects, features, and advantages made apparent to those skilled in the art by referencing the accompanying drawings.

Use of the same reference symbols in different figures indicates similar or identical items.

DETAILED DESCRIPTION OF THE PREFERRED EMBODIMENTS

Figure 1:
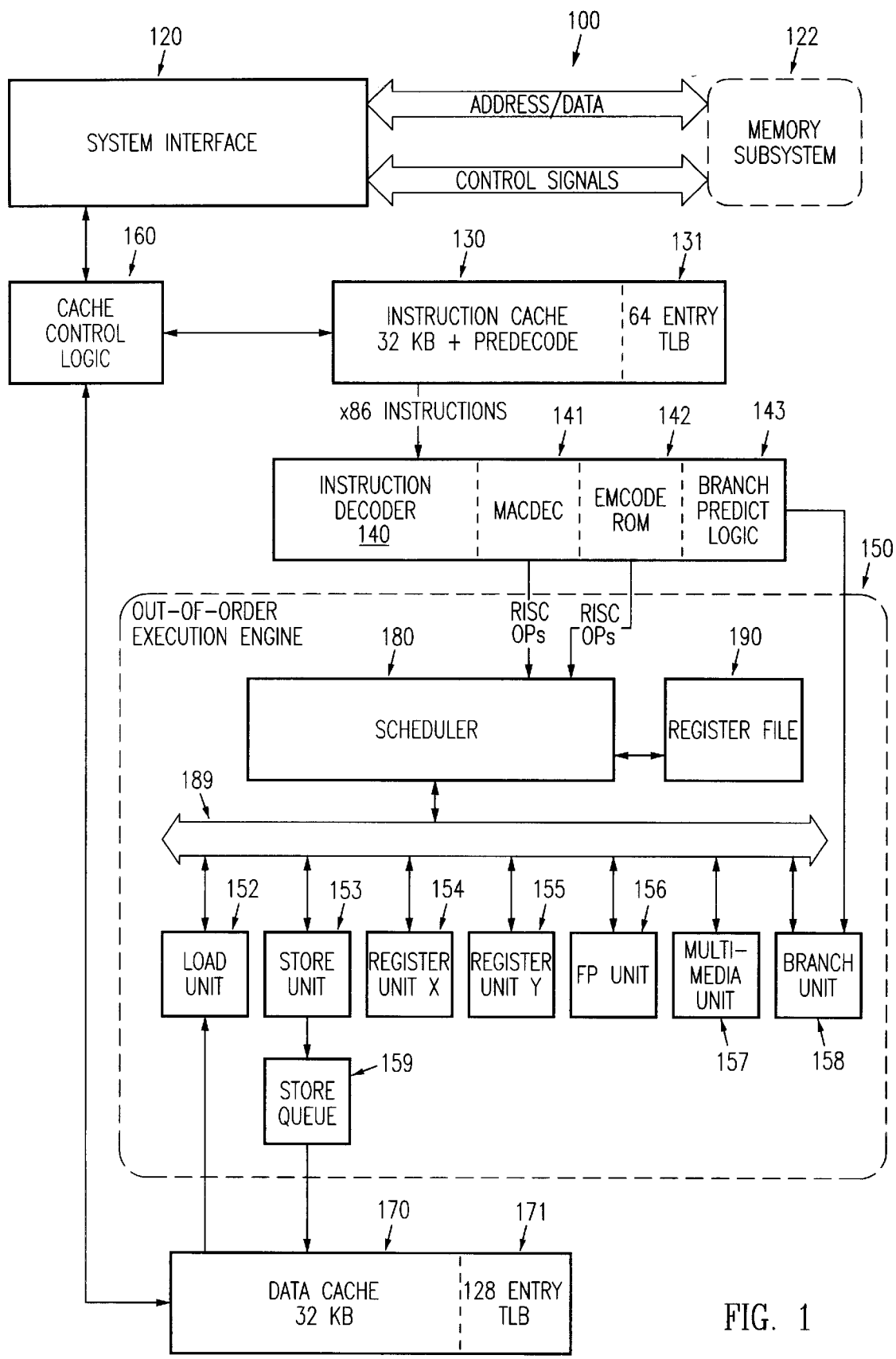
FIG. 1 is a block diagram of a superscalar computer processor providing out-of-order execution control in accordance with an embodiment of the present invention.

FIG. 1 depicts a superscalar processor embodiment of the present invention. Superscalar processor 100 includes an execution engine 150 which implements a reduced instruction set computing (RISC) architecture, an instruction decoder 140, caches, and a system interface 120 providing access to an address space represented in memory subsystem 122 and to devices on local busses (not shown).

Superscalar processor 100 includes a cache which, in the embodiment described herein, is organized as separate data and instruction portions. Data cache 170 and instruction cache 130 are coupled (through cache control logic 160 and via system interface 120) to the address space represented in memory subsystem 122 which includes main memory and optionally includes additional levels of cache, illustratively an L2 cache. Access to an L2 level cache, i.e., to L2 cache control logic and an L2 data portion (not shown), may be provided via system interface 120. Alternatively, L2 cache control logic may be interposed between cache control logic 160 (for L1) and system interface 120.

Cache system designs are well known in the art. In particular, suitable designs implementing split, "Harvard Architecture" instruction and data caches (such as 170 and 130) and multi-level cache hierarchies are well known in the cache arts. In most respects, the cache subsystem of superscalar processor 100 (i.e., data cache 170, instruction cache 130, cache control logic 160, and an optional L2 cache) is of any such suitable design. However, for reasons apart from its caching performance, instruction cache 130 is integrated with pre-decode logic (not shown). Such integrated pre-decode logic identifies x86 instruction boundaries in the fetched instruction stream and facilitates the rapid decoding of instructions by instruction decoder 140. Integration of pre-decode logic with instruction cache 130 is described in greater detail in a U.S. patent application Ser. No. 08/592,207, now abandoned, entitled, "Instruction Predecode and Multiple Instruction Decode," naming Favor, et al. as inventors and filed on Jan. 26, 1996, the detailed description of which is hereby incorporated by reference.

Referring again to FIG. 1, instruction sequences are loaded from the memory subsystem into instruction cache 130 for anticipated execution by execution engine 150. In accordance with the embodiment of processor 100 shown in FIG. 1, instructions in instruction cache 130 are CISC instructions selected from a complex instruction set such as the x86 instruction set implemented by processors conforming to the x86 processor architecture. Instruction decoder 140 converts CISC instructions received from instruction cache 130 to operations for execution engine 150. In the embodiment of FIG. 1, these operations are RISC-like operations (hereafter OPs) and a single x86 instruction from instruction cache 130 decodes into one or more OPs for execution engine 150. Individual OPs fall into one of several type groups including register operations (RegOps), load-store operations (LdStOps), load immediate value operations (LIMMOps), special operations (SpecOps), and floating point operations (FpOps). Alternative embodiments may decode different instruction sets and supply different operation types for execution.

Instruction decoder 140 includes two instruction translation portions, a hardware translation portion MacDec 141 and a ROM-based translation portion 142, together with branch prediction logic 143. Most common x86 instructions are translated into short sequences of 1 to 4 OPs using multiple parallel hardware decoders included in hardware translation portion 141. Hardware translation portion 141 decodes these common x86 instructions received from instruction cache 130 into short sequences of OPs which are then supplied to scheduler 180. Less common x86 instructions and those x86 instructions which translate into OP sequences longer than 4 OPs are translated by a ROM-based translation portion 142 which fetches (from ROM) a translated sequence of OPs corresponding to the particular x86 instruction to be translated. Translated OP sequences from either source, whether generated by hardware decoders or fetched from ROM, are supplied to scheduler 180 for execution by execution engine 150. The design and operation of instruction decoder 140 and the mapping of x86 instructions to RISC OPs are described in greater detail in U.S. patent application Ser. No. 08/592,207, now abandoned, entitled, "Instruction Predecode and Multiple Instruction Decode," naming Favor, et al. as inventors and filed on Jan. 26, 1996, the detailed description of which is hereby incorporated by reference.

Referring again to FIG. 1, execution engine 150 includes a scheduler 180, a register file 190, and multiple execution units which receive and execute OPs dispatched by scheduler 180. In the embodiment of FIG. 1, execution engine 150 includes seven execution units: load unit 152, store unit 153, register units 154 and 155, floating point unit 156, multimedia unit 157, and a branch unit 158, although alternative embodiments may add to or subtract from the set of execution units. In an exemplary embodiment, floating point unit 156 and multimedia unit 157 are omitted. Execution engine 150 also includes a store queue 159 interposed between store unit 153 and data cache 170.

Scheduler 180 is organized as an ordered array of storage entries and logic blocks coupled thereto, which together provide support for out-of-order dispatch of Ops to execution units and for forwarding of Op results to one or more execution units. The ordered array of storage entries and logic blocks also implements a reorder buffer and provides for renaming of the architectural registers defined in register file 190 and speculative execution recovery. Instruction decoder 140 supplies scheduler 180 with new Ops decoded from the instruction stream. In turn, scheduler 180 stores and maintains (in a storage entry) data associated with each new Op received. In this way scheduler 180 tracks the status of each Op and its associated data as the Op is issued to, and executed by, an execution unit. After a given Op is fully executed and data dependencies have been resolved, it is retired and the corresponding scheduler entry is released.

Scheduler 180 is coupled to execution units (i.e., load unit 152, store unit 153, register units 154 and 155, floating point unit 156, multimedia unit 157, and branch unit 158) via a group of busses and control lines collectively shown as a bus 189. Scheduler 180 supplies Ops, register operands, and control signals to the execution units and receives result values and status indications back from the execution units, illustratively via bus 189. Of course, all busses and control lines need not be fully connected and bus 189 is merely illustrative of the bi-directional coupling of scheduler 180 with the execution units.

Load unit 152 and store unit 153 execute LdStOps (i.e., LdOps and StOps), respectively loading data from and storing data to addressable memory. Depending on the caching state of a particular memory address, a LdStOp may complete at the L1 data cache 170, at an L2 cache (not shown), or at main memory (also not shown). Store queue 159 temporarily stores data from store unit 153 so that store unit 153 and load unit 152 can operate in parallel without conflicting accesses to data cache 170. Register units 154 and 155 execute RegOps which operate on a data associated with the architectural registers of register file 190.

Scheduler Overview

Figure 2:
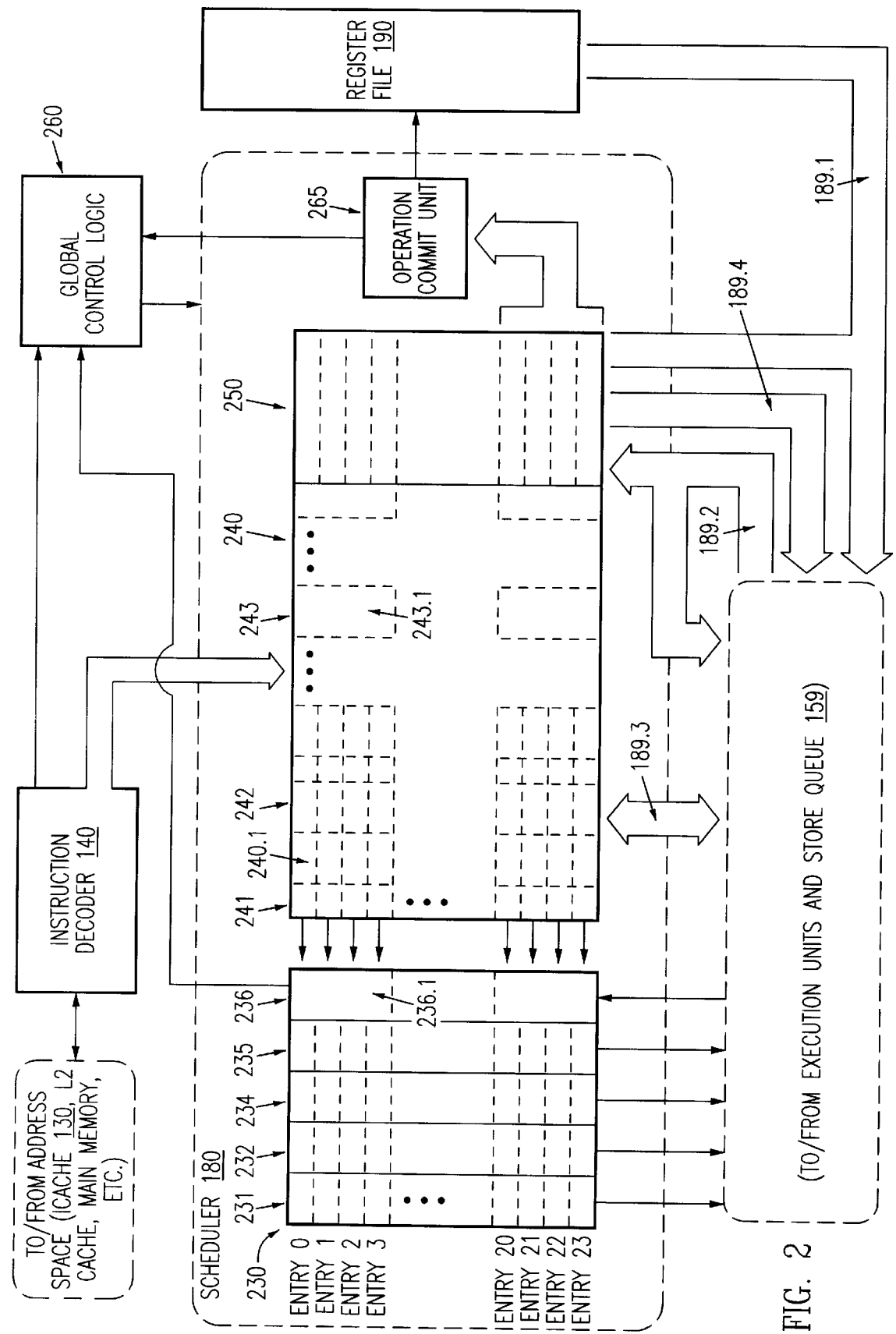
FIG. 2 is a block diagram of a scheduler constructed in accordance with an embodiment of the present invention.

FIG. 2 depicts an exemplary embodiment of scheduler 180 having 24 entries (shown as rows) wherein each entry is associated with a pending Op. Each entry includes a series of fields, collectively shown as scheduling reservoir 240, for representing static and dynamic data associated with a pending Op. In addition, scheduler 180 provides a series of specialized logic blocks, collectively shown as control logic 230, coupled to the entries of scheduling reservoir 240 to receive data associated with pending Ops. The specialized logic blocks (shown as columns 231, 232, 233, 235, and 236) of control logic 230 supply control signals which control the sequencing of Op execution and the supply of operands to and distribution of results from the execution units. Control logic 230 includes issue selection logic 231, operand selection logic 232, load-store ordering logic 234, status flag handling logic 235, and self-modifying code support logic 536.

Issue selection logic 231 controls the selection of Ops from scheduling reservoir 240 for issue to available execution units during each cycle. Operand selection logic 232 identifies an appropriate source for operand data required by Ops which have been issued to execution units. Depending on data dependencies and sequencing of Ops within the execution engine 150, the appropriate source may be register file 190, a destination value field associated with another pending Op entry (destination value fields for scheduler entries are shown collectively as 250), or the result of a complete Op which is supplied on one of the result buses (shown collectively as result busses 272). Control signals supplied by issue selection logic 231 and operand selection logic 232 allow scheduler 180 to issue Ops from scheduling reservoir 240 to available execution units and to select the appropriate operand source for each Op issued.

Although scheduler 180 issues Ops out-of-order and execution units (e.g., load unit 152, store unit 153, register unit X 154, register unit Y 155, and branch unit 158) execute Ops out-of-order, certain Op pairs must be completed in-order with respect to each other. For example, LdOps and StOps which read from and write to the same physical memory location must access memory in-order. Load-store ordering logic 234 maintains such execution ordering between LdOps and StOps. Load-store ordering logic 234 is described in greater detail in U.S. Pat. No. 5,754, 812, entitled "Out-of-Order Load/Store Execution Control" naming Favor et al. as inventors and filed on even date herewith, the detailed description of which is hereby incorporated by reference.

Self-modifying code support logic 236, which is described in greater detail below, triggers a self-modifying code fault in response to indications from store queue 159 and physical address tag fields 243. Store queue 159 provides several bits of the target linear and physical addresses for StOps that store queue 159 is preparing to commit. Self-modifying code support logic 236 compares these address bits to instruction address (or addresses, if the instructions were from different pages) stored as physical address tag fields 243 for each Op quad. If any quad matches, there may be a write to an instruction which has already been fetched or is now present (decoded) as an operation. Accordingly, self-modifying code support logic 236 signals global control logic 260 to flush scheduler 180 and the fetch/decode process is restarted from the instruction following the last committed instruction (i.e., the instruction following the instruction that modified the instruction stream). Scheduler 180 treats detection of self-modifying code as a trap or fault (i.e., it factors into "trap pending").

Scheduler 180 includes a destination value field associated with each scheduler entry. Collectively these destination value fields are shown as 250. In conjunction with operand selection logic 232, destination value fields 250 implement a reorder buffer and implicit register renaming. Operand values associated with architectural registers of register file 190 are represented in destination value fields 250 and are typically supplied to execution units as register operand values via operand busses 271. However, operand values may instead be supplied from register file 190 if none of the destination value fields 250 represent a more recent register state (i.e., an as yet uncommitted register state). Results of completed Ops are supplied via result busses 272 to the destination value field of the scheduler entry associated with the completed Op. In addition, these results may also be supplied to execution units as operands for pending Ops. Results are forwarded via result busses 272.

The fields of a scheduling reservoir entry (illustratively, scheduling reservoir entry 240.1) contain information regarding an operation (Op) which is awaiting execution, which is in the process of being executed, or which is completed. Most of the fields of a scheduling reservoir entry are initialized when instruction decoder 130 loads a new Op into scheduling reservoir 240. However, other fields are later loaded or updated. For example, a state field (shown for each entry as field 242) is updated as the corresponding Op advances through stages of an execution pipeline. Storage fields that retain a value from the time an Op is loaded into scheduling reservoir 240 until retired from scheduler 180 are referred to as "static fields." Fields which can be updated with new values are referred to as "dynamic fields." Static field data and initial data values of dynamic fields are supplied by instruction decoder 140.

A 3-bit field, Type [2:0], of each scheduling reservoir entry (shown in FIG. 2 as type field 241) specifies the Op type associated with the scheduling reservoir entry. Op type is particularly important for issue selection purposes (e.g., LdOps should issue to a load unit such as 150); however, load/store ordering control also makes use of type field 241.

The following signals are decoded from type field 241:

| | |
|---|---|
| 000 = | A Special operation not actually executed. |
| 010 = LU | A LdOp executed by load unit 152. |
| 10x = SU | A StOp executed by store unit 153. |
| 101 = ST | A StOp which references memory or at least generates a faultable address (i.e. not an LEA operation). |
| 11x = RU | A RegOp executed by register unit X 154 or possibly register unit Y 155. |
| 110 = RUX | A RegOp executable ONLY by register unit X 154. |
| 111 = RUY | A RegOp executable by register unit X 154 or register unit Y 155. |

A 4-bit field, State [3:0], of each scheduling reservoir entry (shown in FIG. 2 as type state 242) indicates the current execution state of an Op (S3, S2, S1, and S0 are alternate signal names for State [3:0].) Five possible states of type field 242 are shifting field of ones as follows:

| | |
|---|---|
| 0000 | Unissued |
| 0001 | Stage 0 |
| 0011 | Stage 1 |
| 0111 | Stage 2 |
| 1111 | Completed |

Intermediate states correspond to the current execution stage for an Op corresponding to the entry which the type field appears. The bits are updated (effectively by left shifting) as the Op is successfully issued or advances out of a stage. State [3:0] is also set to 1111 during abort cycles.

The deign and operation of scheduler 180, including static and dynamic field definitions, are described in greater detail in U.S. patent application Ser. No. 08/558,113, now abandoned, entitled "Out-of-Order Execution Engine for Microprocessor" naming Favor et al. as inventors and filed on Nov. 13, 1995, the detailed description of which is hereby incorporated by reference.

Scheduler Op Quad Organization

Scheduler 180 includes 24 entries in scheduling reservoir 240 and destination value fields 250 which are managed as a FIFO. Data corresponding to new Ops are loaded in at the "top," shift toward the "bottom" as execution progresses, and are retired from the bottom of scheduling reservoir 240. To simplify control, scheduler 180 manages scheduling reservoir 240 and destination value fields 250 on an Op quad basis. Ops are loaded into, shifted through, and retired from scheduling reservoir 240 in groups of four. In this way, scheduler granularity matches the decode bandwidth of both the emcode ROM 142 and MacDec 141 of instruction decoder 140. Scheduler 180 therefore manages 24 Op entries as six Op quad entries in a six-deep, four-wide FIFO.

Consequently, scheduling reservoir 240 can be viewed as a six-entry shift register containing Op quads. Each Op quad contains four Op entries, plus additional fields associated with the Op quad as a whole. These Op quad fields, e.g., physical address tag fields 243, are supplied by instruction decoder 140. U.S. patent application Ser. No. 08/558,113, now abandoned, entitled "Out-of-Order Execution Engine for Microprocessor" naming Favor et al. as inventors and filed on Nov. 13, 1995, the detailed description of which is hereby incorporated by reference, enumerates and describes the additional Op quad fields.

Physical address tag fields 243 include Smc1stAddr, Smc1stPg, Smc2ndAddr, and Smc2ndPg fields. Together with an Op quad valid field, OpQV, these physical address tag fields 243 provide descriptive information to self-modifying code support logic 236, which is organized with Op quad granularity. Illustratively, physical address tag fields 243.1 and self-modifying code support logic 236.1 correspond to Op quad 0 of scheduler 180. Smc1stAddr and Smc1stPg represent portions of a first physical memory address for CISC instructions from which an Op (or Ops) of the associated Op quad were decoded. In the exemplary embodiment, physical address tag fields 243 Smc1stPg and Smc1stAddr encode bits 19:12 and 11:5 (respectively) of the physical memory address for the CISC instruction associated with the first Op of the Op quad. Because the CISC instruction precursors of the Ops of an Op quad may cross cache line boundaries a second physical memory address may be necessary to fully tag an Op quad with the addresses of its associated CISC instructions. In such a case, Smc2ndPddr and Smc2ndPg represent portions of a second physical memory address for CISC instructions from which an Op (or Ops) of the associated Op quad were decoded. In the exemplary embodiment, physical address tag fields 243 Smc2ndPg and Smc2ndAddr encode bits 19:12 and 11:5 (respectively) of the physical memory address for the cross-cache-line CISC instructions associated with a subsequent Op (or Ops) of the Op quad. Instruction decoder 140 supplies physical address tag fields 243 Smc1stAddr and Smc1stPg (and Smc2ndAddr and Smc2ndPg if there are CISC instructions from more than one physical memory page represented in the Op quad) to scheduling reservoir 240.

Operation (Op) Timing and Execution Stages

Each entry of scheduling reservoir 240 includes fields describing outstanding Ops. These fields store static information originally derived from the Ops fetched or decoded by instruction decoder 140 and also dynamic state information resulting from Op execution or characterizing the execution pipeline status of a given Op.

From a processor control perspective, scheduler 180 is an instruction sequence-ordered array of Op state information (scheduling reservoir 240) with associated control logic 230 generating control signals to issuing Ops from the array to respective execution units, to control Op execution through sequences of pipeline stages, and to eventually retiring Ops from the scheduler. As shown in FIG. 2, control logic 230 includes five specialized blocks of control logic (issue selection logic 231, operand selection logic 232, load-store ordering logic 234, status flag handling logic 235, and self-modifying code support logic 236), each having portions (illustratively portion 234.3 of load-store ordering logic 234) receiving information from corresponding entries of scheduling reservoir 240. Control logic blocks supply control signals to the execution units. For example, load-store ordering logic 234 supplies control signals to load unit 152 and store unit 153 via control lines represented collectively as 273.

The particular control signals supplied by control logic blocks of scheduling reservoir 240 depend on the state of fields in Op entries. In particular, the State [3: 0] field indicates the progress of execution of associated operations. From a logical perspective, all state sequencing within the scheduler is single cycle in nature. State transition decisions are made each cycle based on the machine state during the cycle. The structure of scheduler 180 reflects the pipelined nature of Op execution. Scheduler 180 (and correspondingly each entry) can be divided into many distinct, rather independent logic portions, each of which is directly associated with a specific processing stage of a given type of operation or execution pipeline.

Figure 3:
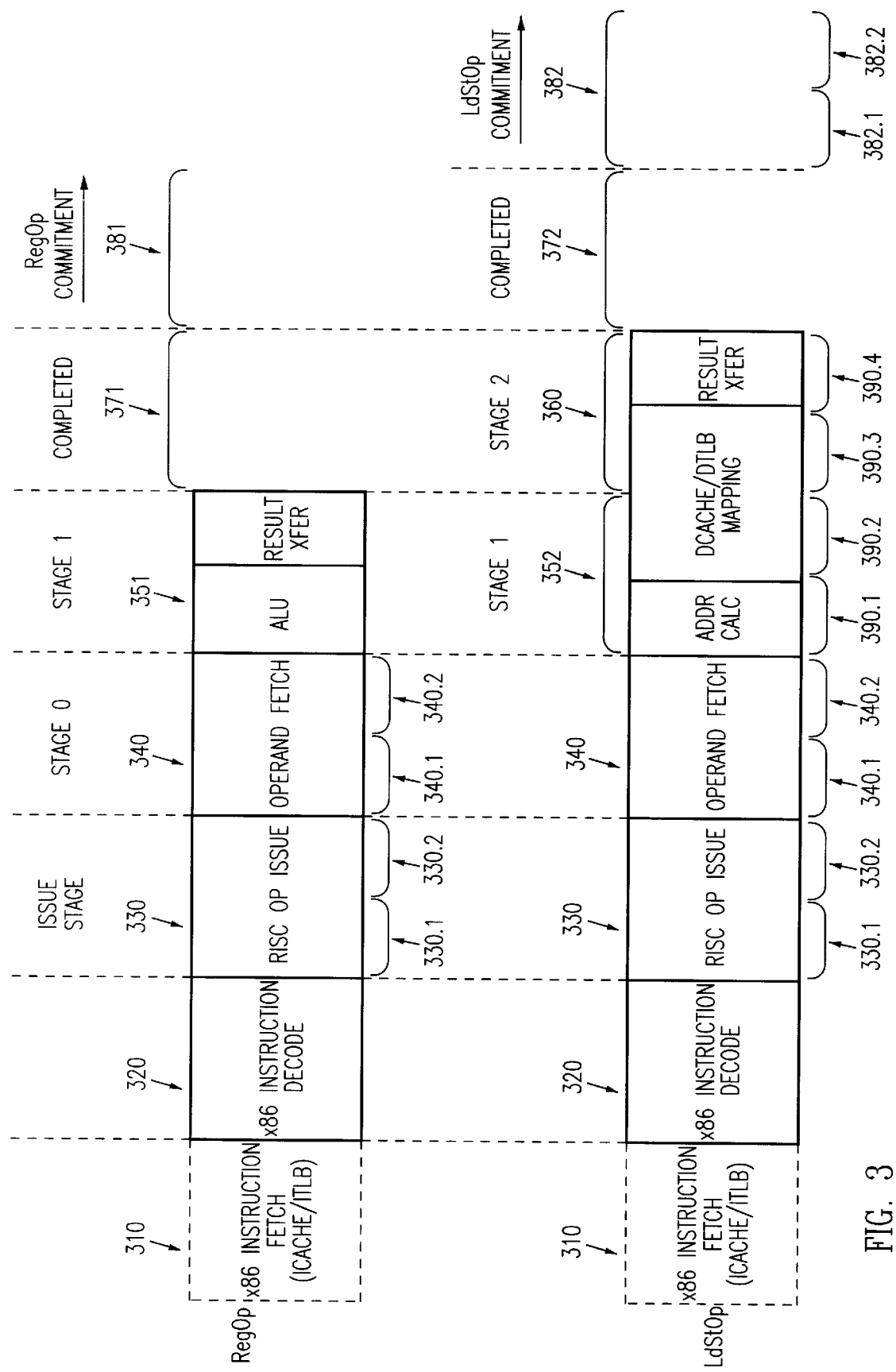
FIG. 3 is a pipeline staging diagram illustrating architectural stages in the execution of instructions in accordance with an embodiment of the present invention.

Pipeline staging of execution engine 150 is now described with reference to FIG. 3. Once an Op is loaded into execution engine 150, the Op goes through a three or four stage pipeline, and correspondingly transitions between four or five states represented by the field State [3: 0] within the scheduler entry associated with the Op. Instruction fetch and decode are performed before execution engine 150, therefore the first scheduler-related pipeline stage is the issue stage. FIG. 3 shows pipeline staging for RegOps and LdStOps. Handling for other Ops, including BrOps, is described in U.S. patent application Ser. No. 08/558,113, now abandoned, entitled "Out-of-Order Execution Engine for Microprocessor" naming Favor et al. as inventors and filed on Nov. 13, 1995, the detailed description of which is hereby incorporated by reference.

Scheduler 180 exerts primary control over execution pipelines during the issue and operand fetch stages, 330 and 340. Processing within issue stage 330 and within operand fetch stage 340 can be broken down into two phases per stage, wherein each phase nominally occupying a half clock cycle. Issue stage 330 includes an issue selection phase and a broadcast phase, while operand fetch stage 340 includes an operand selection phase and operand forwarding phase.

Issue Stage

During the issue selection phase 330.1 of issue stage 330, scheduler 180 selects the next Ops to enter the pipelines associated with load unit 152, store unit 153, register unit X 154, and register unit Y 155 (four Op selections occur at once). During the broadcast phase 330.2 of issue stage 330, information about each of the register operands for each selected Op is broadcast to all scheduler entries and to external logic (including register file 190 and the execution units). In this way, the broadcast phase 330.2 sets up to locate operand values which may reside in one of the destination value fields 250 of scheduler 180 or in register file 190, or which may correspond to results to be produced on result busses 272 one of the execution units (e.g., load unit 152, store unit 153, or register units 154 and 155).

Operand Fetch Stage

During the operand selection phase 340.1 of operand fetch stage 340, scheduler 180 locates up to eight operand values (4 Ops*2 operands/Op) and determines the status of each operand value, i.e., whether a valid value is in fact available from the designated source. Based on this information, scheduler 180 determines which of the Ops in operand fetch stage 0 (stage 340) will advance into their respective execution pipes, i.e., into stage 1 (stage 350), following the operand forward phase. Advancement decisions are made independently for each Op and only operand dependencies need constrain the order with which operations are actually executed. Absent such data dependencies, Ops which issue to different execution units are generally processed through their respective pipelines in arbitrary order with respect to those Ops assigned to other execution units. One exception to this general rule involves the respective ordering of loads and stores (i.e., of LdOps and StOps) and is in greater detail discussed below.

LdStOp Execution Stages

The first two scheduler-related stages, the "operand issue" stage 330 and the "operand fetch" stage 340 are common to RegOps and LdStOps. Subsequent stages are the execution stages. RegOps include a single execution stage 350 because all RegOps execute in a single cycle. Furthermore, once a RegOp enters the execution stage, it always successfully completes and exits stage 350 at the end of that clock cycle. LdStOps, on the other hand, have two execution stages 352 and 360, during which address calculation, segment and page translation (and protection checking), and data cache accessing (in the case of LdOps) all take place. Unlike RegOps, LdStOps can be held up for arbitrary periods of time in either stage 360 or 370. Most hold ups appear in the second stage 370. Most commonly, hold ups in stage 370 result from data cache 170 misses, data TLB 171 misses, and page faults. Hold ups in stage 360 result from misaligned memory references and from stage 370 being occupied and blocked by an LdStOp not advancing to completion.

During the operand forward phase 340.2 of operand fetch stage 340, scheduler 180 transfers operand values from the designated sources via operand busses and/or result busses shown collectively in FIG. 2 as busses 271 and 272 to execution units such as load unit 152, store unit 153, register unit X 154, and register unit Y 155. The exemplary embodiment includes nine operand busses 271, eight of which provide operand values for operations in stage 0. Also in the exemplary embodiment, operand transfers occur regardless of whether values are valid, thereby simplifying control logic. If an operand value is invalid, it is ignored by the respective execution unit because the scheduler 180 does not advance the associated operation to stage 1. Immediate values for RegOps are handled as part of the register operand forwarding mechanism described above. In such cases, the immediate value is forwarded directly from the particular one of the destination value fields 250 of the scheduler 180 entries associated with the Op.

Displacement values are also transferred during operand forward phase 340.2, via displacement busses 189.4, to load unit 152 and store unit 153 (independent values 10 to each unit). These displacements are 32-bit values and always come from the entries of scheduler 180. The selection of the source entry occurs during operand selection phase 340.1. When a LdOp or a StOp enters stage 1, load unit 152 and store unit 153 latch associated displacement and operand values.

Scheduler 180 implements the four-phase control mechanism (as described above) for providing the address operands and displacement; however, StOps require a store data operand in addition to address operands and displacement values. Scheduler 180 performs a four-phase process for obtaining the store data for a StOp. The StOp data obtaining process is similar to that described above; however the store data is obtained during execution stage 2 (370). The process for providing the store data is synchronized with stages 1 and 2 of the StOp and includes a selection phase 390.1 identifying the StOp in execution stage 1, a broadcast phase 390.2 transmitting information describing the source of a data operand, a data operand selection phase 390.3, and an data operand forwarding phase 390.4. Store data is fetched in parallel with StOp execution; and the actual data value is obtained and provided to store queue 159 upon completion of StOp processing. If a valid store data value is not available, the StOp is held up in stage 2.

U.S. Pat. No. 5,754,812, entitled "Out-of-Order Load/Store Execution Control" naming Favor et al. as inventors and filed on even date herewith, the detailed description of which is hereby incorporated by reference, describes execution ordering constraints related to LdOps and StOps.

These constraints may also hold StOps in stage 2.

Op Completion Stage

In the exemplary embodiment, RegOps and LdOps complete by storing results to one of the destination value fields 250 of scheduler 180. Each of the destination value fields 250 is associated with an Op entry and is used as a temporary store (a reorder buffer) for values which may eventually be committed to register file 190 by OCU 265. For StOps, the corresponding temporary store before commitment to memory is store queue 159. Store queue 159 buffers memory writes associated with a StOp in a first commit stage until OCU 265 releases the memory write to a second commit stage.

Op Commitment and Retirement

Register, flag, and memory state changes associated with completed Ops are committed (or made permanent) by OCU (Operation Commit Unit) 265. OCU 265 then retires the corresponding Op entry from scheduler 180. Several types state changes can result from the execution of an Op. The principal types of state changes are abortable and include: general register changes; status flag changes; and memory writes. General register changes result from all RegOps, LdOps, LIMM Ops, LDKxx operations, and STUPD StOps. Status flag changes result from ".cc" RegOps, and memory writes result STxxx StOps. Scheduler 180 and store queue 159 support abortable state changes through the general technique of temporarily storing register and status results in the destination value fields 250 and scheduling reservoir 240 of scheduler 180 and by storing memory write data in store queue 159. Temporary (or speculative) register values, status values, and memory write values are held until the associated Ops are committed and retired by OCU 265. Scheduler 180 speculatively supplies register values, status values, and memory write values residing in scheduling reservoir 240 and store queue 159 to dependent Ops as necessary. However, permanent state changes to register file 190 and to the memory address space (distributed among data cache 170, instruction cache 130, an L2 cache, and main memory) are made during Op commitment.

During each cycle, OCU 265 examines each of the Op entries within the bottom Op quad entry and tries to commit the results of as many of these operations as possible. The state changes associated with the four Ops of an Op quad may be committed in one cycle or over many cycles. If all the Ops of an Op quad have been committed or are being successfully committed, the Op quad is retired from scheduler 180 at the end of the current cycle. Otherwise, as many state changes as possible are committed and the process is repeated during successive cycles until all state changes have been committed.

Commitments of register results, status results, and memory writes are performed independently. For Ops which have multiple results (e.g., a RegOp with both register and status results, or a STUPD operation with both a register result and a memory write), the various results are not necessarily committed simultaneously. Instead, commitment of one type of state change is independent of the other. The overall commitment of an Op occurs when the last result is committed. In general, results of an Op are not committed until:

1. the Op execution state (State[3:0]) of the Op entry indicates the Op is Completed;
2. the State [3:0] of any preceding faultable operations, namely any preceding LdStOps, is Completed, which implies that the operations are fault-free; and
3. the State [3:0] of any preceding BRCOND operation is Completed, which implies that the BRCOND was correctly predicted.

For StOps which generate a memory write, an additional constraint is that only one write can be committed per cycle from store queue 159 into data cache 170. OCU 265 can commit up to four register and four status results and one memory write per cycle and typically commits and retires an Op quad from scheduler 180 every cycle. An Op quad can remain unretired at the bottom of scheduler 180 for more than one cycle only if the Op quad contains multiple memory write StOps or if one of the operations in the Op quad is sufficiently delayed in its execution that the associated State [3:0] field 242 is not yet marked Completed.

The retirement of Ops with associated register and status flag changes and the handling of fault conditions are described in U.S. patent application Ser. No. 08/558,113, now abandoned, entitled "Out-of-Order Execution Engine for Microprocessor" naming Favor et al. as inventors and filed on Nov. 13, 1995, the detailed description of which is hereby incorporated by reference. The discussion which follows, focuses on commitment and retirement of StOps.

OCU 265 manages and controls the commitment of memory write data values associated with StOps to the memory address space, i.e., to locations in the L1 cache (data cache 170 and instruction cache 130), an L2 cache, and main memory. Memory write commitment involves an associated store queue 159 entry and at most one memory write is committed by OCU 265 per cycle. OCU 265 scans scheduling reservoir 240 field values for Op entries in the bottom two Op quad to identify StOps with memory writes to commit.

When a StOp completes execution in store unit 153, the associated target memory address and store data is entered in store queue 159. Later, when the memory write for a StOp is actually committed, this entry is read and retired from store queue 159. Since StOps are executed in order and committed in order, store queue 159 is managed as a simple FIFO. As a result, the matching of store queue 159 entries with associated StOps in scheduler 180 is straightforward.

During each cycle, OCU 265's memory write commit logic searches the bottom two Op quad entries of scheduler 180 for the next/oldest uncommitted memory-writing StOp (i.e. for the next StOp and associated store queue 159 entry to try and commit). Since scheduler 180 and store queue 159 are both managed as FIFOs, the Op entry selected by OCU 265 must be associated with the bottom/oldest entry of store queue 159.

The StOp (memory write) commitment process is implemented as a two-stage commit pipeline. During the first commit stage, no control decisions are made. Instead, OCU 265 triggers a data cache tag lookup for the store queue 159 entry associated with the next/oldest uncommitted memory-writing StOp in scheduler 180. The accessed tag data is simply latched for examination during the second commit stage. Data cache 170 tag lookup is performed "blindly," i.e., without consideration for whether the associated StOp is presently committable. In the exemplary embodiment, OCU 265 selects an Op entry from scheduler 180 and store queue 159 concurrently presents the memory write address for the associated store queue 159 entry to data cache 170 (i.e., initiates a tag lookup).

A write commit is able to advance into commit stage 2 when that stage is either empty or is successfully completing the commitment of a write. When a memory write from store queue 159 does enter commit stage 2, the associated StOp can be retired from scheduler 180. OCU 265 determines whether the selected StOp is committable, i.e., whether:

1. the Op execution state (State[3:0]) of the Op entry indicates the selected StOp is Completed;
2. the State [3:0] of any preceding faultable operations is Completed; and
3. the State [3:0] of any preceding BRCOND operation is Completed. If the selected StOp is committable and the write commit has been able to advance into the second write commit stage, OCU 265 considers the StOp to be committed. In the next cycle, OCU 265 searches for and moves on to the next memory-writing StOp and the remainder of the commit process proceeds asynchronous to OCU 265 and scheduler 180.

The write commit pipeline of store queue 159 is one write wide and therefore supports the commitment of only one memory-writing StOp per cycle. For Op quads which containing no more than one memory-writing StOp, this allows the possible commitment and retirement of one Op quad per cycle. However, for Op quads containing two, three, or four such StOps, a corresponding minimum number of cycles is required to commit the each StOp entry of the Op quad. As a result such an Op quad remains at the bottom of scheduler 180 for at least the corresponding number of cycles.

This throughput mismatch is partially mitigated by OCU 265 support for committing memory writes associated with StOps in the next oldest Op quad (Op quad 4). Since memory writes are committed in order, this allows OCU 265 to get a "head start" on multiple write Op quads when the bottom Op quad is held up but otherwise empty of uncommitted memory writes, or when it simply does not contain any StOps. This helps to better match OCU 265's one write per cycle commitment rate to the average number of memory writes per Op quad which is less than one per Op quad.

A special situation arises when a StOp's memory reference crosses an alignment boundary (currently 8 bytes) and is split by store unit 153 into two memory writes having two associated entries in store queue 159. In such situations, OCU 265 take two cycles to retire the two entries of store queue 159 and does not officially commit the StOp until the second cycle. If the StOp faults, it is aborted without retirement of either entry of store queue store queue 159.

The following pseudo-RTL description summarizes the functionality of the OCU 265's write commit logic. op0 is the oldest Op and op3 is the youngest Op in the bottom/last Op quad of scheduler 180. Similarly, op4–op7 are the corresponding Ops in the second to last Op quad of scheduler 180 and op8–op11 are the corresponding Ops in the third to last Op quad of scheduler 180. The operation of OCU 265 is based on a set of mask bits (CmtMask[7:0]) which represent the OCU 265's progress in committing memory-writing StOps from the last two Op quad.

In operation, the first N-bits (starting from bit 0) of CmtMask [7:0] are clear indicating that OCU 265 has committed any StOps up to the Nth such Op position, which contains the next StOp to be committed. All Ops corresponding to the remaining, set mask bits of CmtMask [7:0] have yet to be examined for committable StOps. OCU 265 also maintains a set of bits (UncmtStOp[7:0]) indicating which Op positions contain uncommitted memory-writing StOps.

During each cycle, OCU 265 selects the next uncommitted StOp and generates a new set of mask bits based on the position of the selected StOp. The unmasked Ops are examined to determine whether the selected StOp is presently committable or an abort cycle needs to be initiated. In the former case, if the selected StOp is committable and if stage 2 of the commit pipe is able to accept a new write commit at the end of the cycle, OCU 265 commits the StOp and updates the UncmtStOp bits. OCU 265 also shifts the bits of UncmtStOp to match any shifting of the last two Op quads.

---

StCmtSel[3:0] = priority_encode(
  (OPQ5:OpQV UncmtStOp[0]), . . . ,
  (OPQS:OpQV UncmtstOp[3]),
  (OPQ4:OpQV UncmtStOp[4]), . . . ,
  (OPQ4:OpQV UncmtStOp[7]) )
//StCmtSel=0000 if OP0 selected (highest priority)

-continued

```
//StCmtSel=0111 if OP7 selected (lowest priority)
//StCmtSel=1111 if no Op selected
CmtMask[7:0] = {(StCmtSel[2:0] < 'b111), . . . ,
  (StCmtSel[2:0] < 'b000) }
//this generates a field of zeroes from bit 0 up to and
//including the bit pointed at by StCmtSel[2:0], and a
//field of ones past this up to bit 7
//note: most of these terms can be simplified
CmtCiaCda =
  (~CmtMask[7] OP7:Type[2]) +
  (~CmtMask[6] CmtMask[7] OP6:Type[2]) +
  (~CmtMask[5] CmtMask[6] OP5:Type[2]) +
  (~CmtMask[4] CmtMask[5] OP4:Type[2]) +
  (~CmtMask[3] CmtMask[4] OP3:Type[2]) +
  (~CmtMask[2] CmtMask[3] OP2:Type[2]) +
  (~CmtMask[1] CmtMask[2] OP1:Type[2]) +
  (~CmtMask[0] CmtMask[1] OP0:Type[2])
StCmtInh = CmtInh + StCmtSel[2] & (OPQ4:LimViol +
  SmcHit ~CmtCiaCda + "trap pending")
StCmtV = ~StCmtSel[3] ~StCmtInh (CmtMask[7] + OP7:S3) &
  (CmtMask[6] + OP6:S3 + OP6:RU) &
  (CmtMask[5] + OP5:S3 + OP5:RU) &
  (CmtMask[4] + OP4:S3 + OP4:RU) &
  (CmtMask[3] + OP3:S3 + OP3:RU) &
  (CmtMask[2] + OP2:S3 + OP2:RU) &
  (CmtMask[1] + OP1:S3 + OP1:RU)
Q5StCmtV = ~StCmtSel[2] ~CmtInh (CmtMask[3] + OP3:S3) &
  (CmtMask[2] + OP2:S3 + OP2:RU) &
  (CmtMask[1] + OP1:S3 + OP1:RU) &
  (CmtMask[0] + OP0:S3 + OP0:RU)
StAdv = ~STQ_FirstAddr ~DC_HoldSC1 CHP_AdvSC2 +
  CmtCiaCda
StRetire = StCmtV StAdv
Q5StRetire = StAdv Q5StCmtV
NewUncmtStOp[7:0] = { (CmtMask[7] OP7:Type=ST), . . . ,
  (CmtMask[0] OP0:Type=ST) }
AllStCmt = StCmtSel[2] + Q5StRetire ~NewUncmtStOp[3]
  &. . .& ~NewUncmtStOp[0]
//indicates when all memory-writing StOps have been
//committed or are being successfully committed in the
//bottom scheduler Op quad entry
//update UncmtStOp bits:
NextUncmtStOp[7:0] =
  (StRetire) ? NewUncmtStop[7:0] : UncmtStOp[7:0]
NextUncmtStOp[11:8] = { OP11:Type=ST, OP10:Type=ST,
  OP9:Type=ST, OP8:Type=ST }
@clk:
  UncmtStOp[7:4] = (LdEntry4) ? NextUncmtStOp[11:8] :
    NextUncmtStOp[7:4]
  UncmtStOp[3:0] = (LdEntry5) ? NextUncmtStOp[7:4] :
    NextUncmtStOp[3:0]
SC_HoldSC1 = ~StQCmtV + CmtCiaCda
StAbort = ~StCmtSel[2] SUViol &
  ((StCmtSel[1:0] == 00) ~OP0:S3 +
  (StCmtSel[1:0] == 01) ~OP1:S3 OP0:S3 +
  (StCmtSel[1:0] == 10) ~OP2:S3 OP1:S3 OP0:S3 +
  (StCmtSel[1:0] == 11) ~OP3:S3 OP2:S3 OP1:S3 OP0:S3)
```

Self-Modifying Code Handling Logic

Memory writes are committed to the address space (i.e., to data cache 170, to instruction cache 130, to an L2 cache, and/or to main memory) in phase 2 382.2 of LdStOp commitment stage 382. Since load-store ordering logic 234 enforces execution ordering between LdOps and StOps which access the same memory address, a younger load is guaranteed to return the just-committed memory write data (see U.S. Pat. No. 5,754,812, entitled "Out-of-Order Load/Store Execution Control", the detailed description of which is hereby incorporated by reference, for a more detailed description). However, if the memory write committed in phase 2 382.2 of LdStOp commitment stage 382 stores into the instruction stream, younger Ops (and their precursor x86 instructions) in various pipeline stages (i.e., x86 instruction fetch stage 310, x86 instruction decode stage 320, issue stage 330, operand fetch stage 340, execution stages 351, 352, and 360) may be based on stale instruction bytes. Even Ops which have completed and are awaiting commitment by OCU 265 may be based on stale instruction bytes. Self-modifying code handling components of scheduler 180 and instruction decoder 140 trap stores into the instruction stream to flush stale data as described below.

Figure 4:
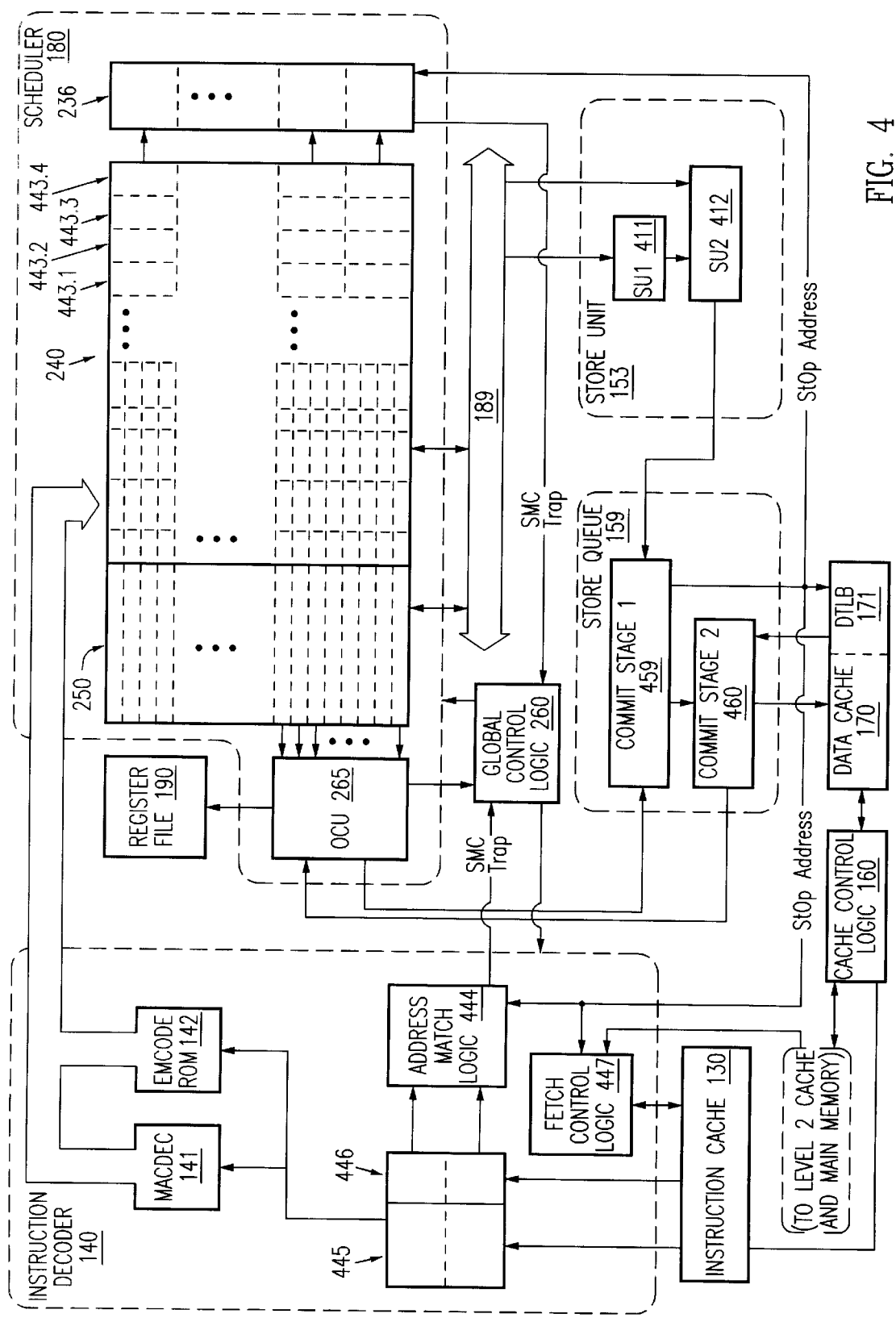
FIG. 4 is a block diagram of out-of-order load and store execution control components in accordance with an embodiment of the present invention.

Referring to FIG. 4, StOps are committed to the address space by stage 2 460 of store queue 159. The corresponding Op quad is retired from scheduler 180 by OCU 265 if each of entries of the Op quad has been completed (or is in the process of being committed). Stage 1 459 of store queue 159 provides portions of the linear and physical address (i.e., the StOp address) for memory write data which the store queue 159 is preparing to commit in stage 2 460. In particular, stage 1 459 of store queue 159 provides bits 11-5 of the linear address STQ_LinAddr (11,5) and bits 19-12 of the physical address STQ_PhysAddr(19,12). Self-modifying code support logic 236 of scheduler 180 receives the StOp address and compares it against respective physical address tags Smc1stAddr, Smc1stPg, Smc2ndAddr, and Smc2ndPg stored in Op quad fields 443.1, 443.2, 443.3, and 443.4 of scheduling reservoir 240. Based on this comparison, self-modifying code support logic 236 determines whether the StOp being committed by store queue 159 writes to an address covered by any Op quad in scheduler 180. If so, self-modifying code support logic 236 triggers a Self-Modifying Code (SMC) trap. Global control logic 260 flushes scheduler 180 and the fetch/decode process is restarted from the instruction following the last committed instruction (i.e., the instruction following the instruction that modified the instruction stream).

As previously described, instruction decoder 140 supplies the contents of Op quad fields 443.1, 443.2, 443.3, and 443.4 (collectively shown in FIG. 2 as physical address tag fields 243) as Ops are issued to scheduler 180. The physical address tags Smc1stAddr, Smc1stPg, Smc2ndAddr, and Smc2ndPg stored in Op quad fields 443.1, 443.2, 443.3, and 443.4 represent bits 19-5 of the first and second physical memory addresses for x86 instructions from which Ops of the corresponding Op quad were decoded. Two physical memory addresses are required when the Ops of the corresponding Op quad were decoded from an x86 instruction (or instructions) which cross a cache line boundary. These following pseudo-RTL further describes the design and operation of self-modifying code support logic 236:

```
for (i=0; i < 5; ++i) {
  unit Match1st =
    (STQ_LinAddr(11,5) == OpQi:Smc1stAddr) &&
    (STQ_PhysAddr(19,12) == OpQi:Smc1stPg);
  unit Match2nd =
    (STQ_LinAddr(11,5) == OpQi:Smc2ndAddr) &&
    (STQ_PhysAddr(19,12) == OpQi:Smc2ndPg);
  MatchSMC[i] = (Match1st || Match2nd) && OpQi:OpQV;
}
SmcHit =
  "STQ store is not a special memory access" &&
  ("self-modifying code detected by DEC
  (fetch/decode) unit" || MatchSMC[0] ||
  MatchSMC[1] || MatchSMC[2] ||
  MatchSMC[3] || MatchSMC[4]);
```

Instruction decoder 140 also traps self-modifying code using physical address tags. In particular, address match logic 444 and fetch control logic 447 of instruction decoder 140 receive portions of the linear and physical address (i.e., the StOp address) for the memory write which the store queue 159 is preparing to commit in stage 2 460. As before, stage 1 459 of store queue 159 provides bits 11-5 of the linear address STQ_LinAddr (11,5) and bits 19-12 of the physical address STQ_PhysAddr (19,12). Address match logic 444 compares the StOp address against address tags 446 respectively associated with entries in instruction buffer 445. If a match is found, address match logic 444 triggers an SMC trap. Global control logic 260 flushes instruction decoder 140 and the fetch/decode process is restarted from the last committed instruction.

In the exemplary embodiment, an SMC trap is handled as follows. After all Ops associated with the triggering StOp are committed (i.e., the set of Ops decoded from the same x86 instruction as the triggering StOp or the entire Op quad in which the triggering StOp is a member, whichever is larger), Ops associated with subsequent x86 instructions are aborted. In the exemplary embodiment, the following emcode implements an SMC trap:

```
=>
DfhSMC:     RDSR4      _,_,_        //start two-step process to read
            SR4
            RDSR4      t7,_,_       //get faultPC
            LDK        t9,0x0030    //clear SSTF andDTF to reset any
            WRSR1      _,t9,_       //pending debug traps and,
            NoEretRetire            //especially, to also clear SMCTF
            =
DfhSMC1:    RDSRO      t8,_,_       //get (fresh) copy of STCV bit
            EAND.cc    _,t8,0x20
            Brcc       DfhSMC1,EZFO,pt,SeqEret
                                    //if STCV bit is (still) set,
                                    //then keep waiting, else go jump
            to
<=                                  //faultPC (i.e. next mI)
SeqEret:    WRIP       _,t7,_       //note,em. env. is invalid here
            ERET
<=
```

The SMC trap emcode obtains the Extended Instruction Pointer (EIP) of the above aborted instruction. The SMC trap emcode then waits until the triggering StOp is acknowledged by the memory subsystem. In an alternative embodiment which includes an L2 cache interposed between the data cache 170 and main memory, the triggering StOp could instead be acknowledged by the L2 cache. In either case, such an acknowledgment means that a snoop to instruction cache 130 has already been issued. After the SMC trap emcode has synchronized with the memory write associated with the triggering StOp, it then jumps back (doing a WrIP) to fetch the next x86 instruction in the instruction stream. At this point it is guaranteed that the next bytes fetched from main memory (or alternatively from the L2 cache) will be up to date.

Even a StOp that does not trigger an SMC trap creates a window of time after the associated memory write is committed, but before a snoop is issued to instruction cache 130, during which any new instruction bytes fetched by instruction decoder 140 are potentially stale. To overcome this, fetch control logic 447 of instruction decoder 140 stores a copy of the physical address (i.e., the StOp address) associated with the committed memory write. Whenever instruction decoder 140 fetches new instruction bytes from instruction cache 130, fetch control logic 447 checks the current fetch address against its stored copy of StOp address for the last-committed memory write. If the current fetch address matches with the stored copy of the StOp address, then fetch control logic 447 nullifies the fetch. Fetch control logic 447 of instruction decoder 140 continues to reissue the same fetch address until the committed StOp is acknowledged by the memory subsystem. When fetch control logic 447 receives an acknowledgment from the memory subsystem, it clears its StOp address store. In an alternative embodiment which includes an L2 cache interposed between the data cache 170 and main memory, the acknowledgment could be supplied instead by the L2 cache.

In the exemplary embodiment, the memory subsystem issues a snoop to instruction cache 130 before or (at the latest) concurrent with its StOp acknowledgment. While the instruction cache 130 is processing a snoop, it inhibits the processing of fetches from instruction decoder 140. By inhibiting fetches during snoop processing, instruction cache 130 closes a second short window during which instruction fetches could potentially return stale bytes.

Each Op quad of scheduler 180 may contain bytes of decoded x86 instructions spanning two lines of instruction cache 130. Similarly, an entry in instruction buffer 445 may span two lines of instruction cache 130. In the exemplary embodiment, a line in the instruction decoder 140 is 32 bytes. This means that the physical address tags associated with each Op quad entry of scheduler 180 and with each entry of instruction buffer 445 need to encode addresses for both possible 32-byte cache lines. In one embodiment of address tags 446 and physical address tag fields 243, a pair of complete physical addresses tags (bits 31:5) is stored for each Op quad entry of scheduler 180 and for each entry of instruction buffer 445. However, to reduce hardware, while at the same time avoiding a high frequency of false matches, the exemplary embodiments of address tags 446 and physical address tag fields 243 store partial physical addresses, each containing bits 19:5 of the physical memory address of the associated x86 instruction (or instructions).

The exemplary embodiment supports single-cycle throughput of writes to memory. The data cache 170 is a write-back cache. When a memory write commitment associated with a StOp hits in data cache 170 and the line is found to be Owned or Dirty, then the write can be processed at a rate of 1 per-cycle. This situation presents some difficulty with respect to handling self-modifying code if an Owned/Dirty line is allowed to reside in both the data cache 170 and instruction cache 130. In one embodiment, instruction cache 130 would have to be snooped immediately with the StOp being committed, which would add complexity since contention issues arise in access instruction cache 130 tag RAM. In addition, a dedicated address bus (not shown) would have to be sent from the data cache 170 to 30 the instruction cache 130. In order to minimize this complexity, while still maintaining mutual exclusion between the instruction cache 130 and the data cache 170, cache control logic 160 prevents a cache line from residing in both caches at the same time in the exemplary embodiment. The estimated performance impact of this restriction is negligible.

One constraint imposed by this scheme is that a StOp cannot write to the instruction stream if the modified bytes are decoded into the same Op quad entry as the writing StOp and the StOp is older with respect to the modified bytes. However, a processor conforming to the x86 processor architecture must transfer control specification before starting to execute from the modified instruction stream. See Intel Pentium Processor, Software Reference Manual. In the exemplary embodiment, this requirement (if followed) eliminates the possibility that a StOp which stores into the instruction stream and the bytes that it writes will ever be in the same Op quad of scheduler 180.

System Embodiments

Figure 5:
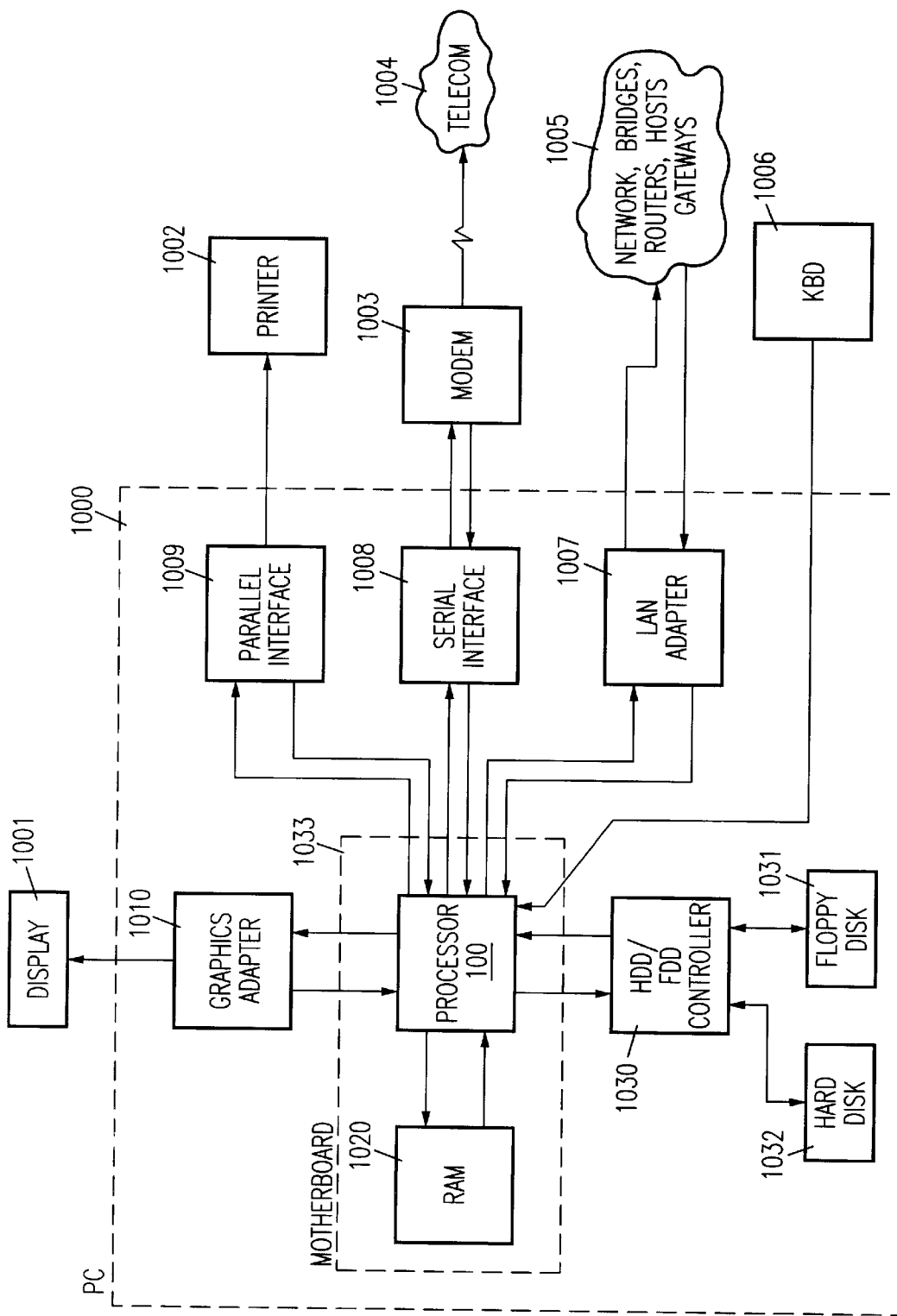
FIG. 5 is a block diagram of a personal computer incorporating a processor which includes a self modifying code handling system in accordance with an embodiment of the present invention.
Figure 6:
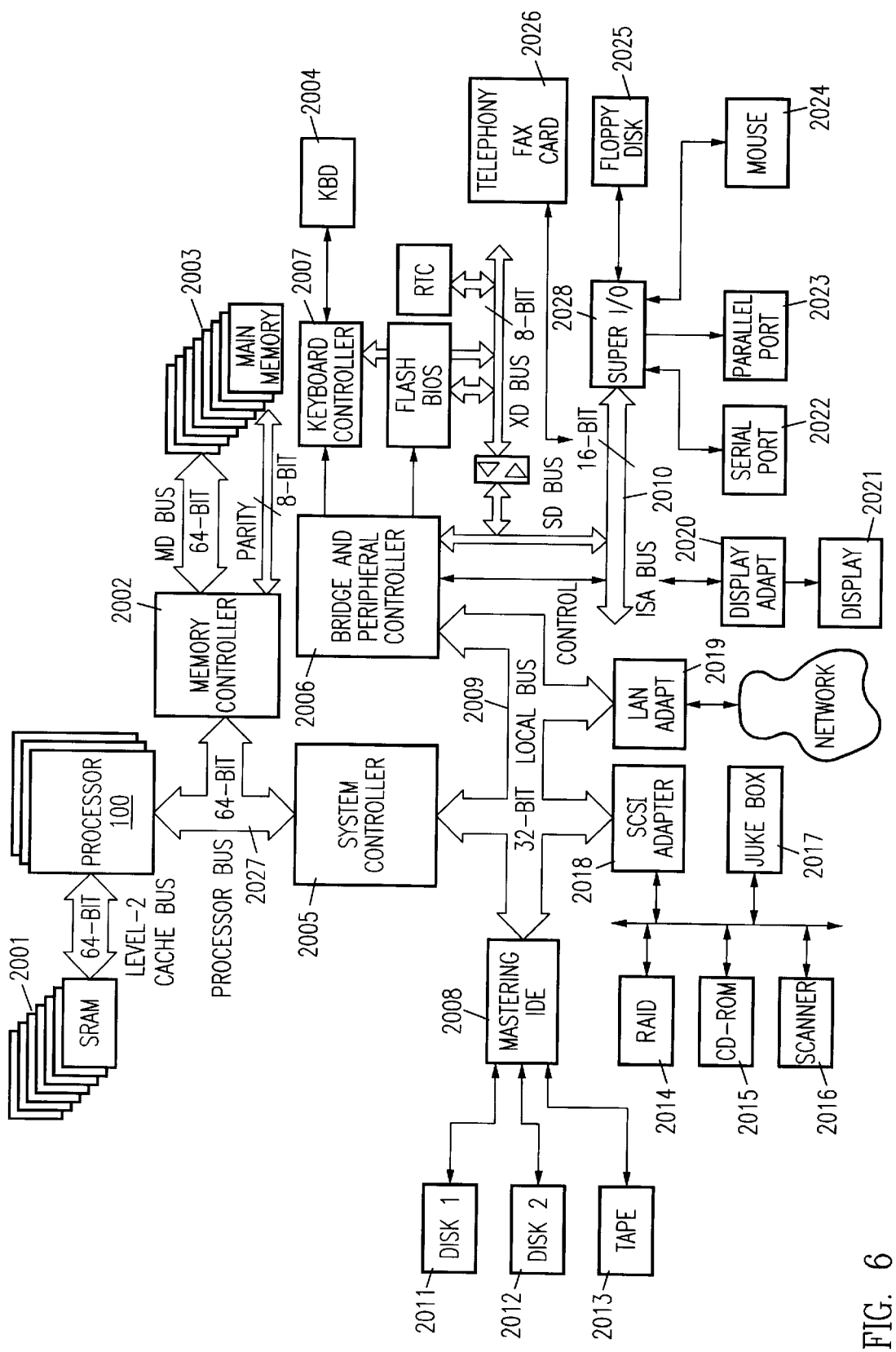
FIG. 6 is a block diagram of a networked server computer incorporating a processor which includes a self modifying code handling system in accordance with an embodiment of the present invention.
Figure 7:
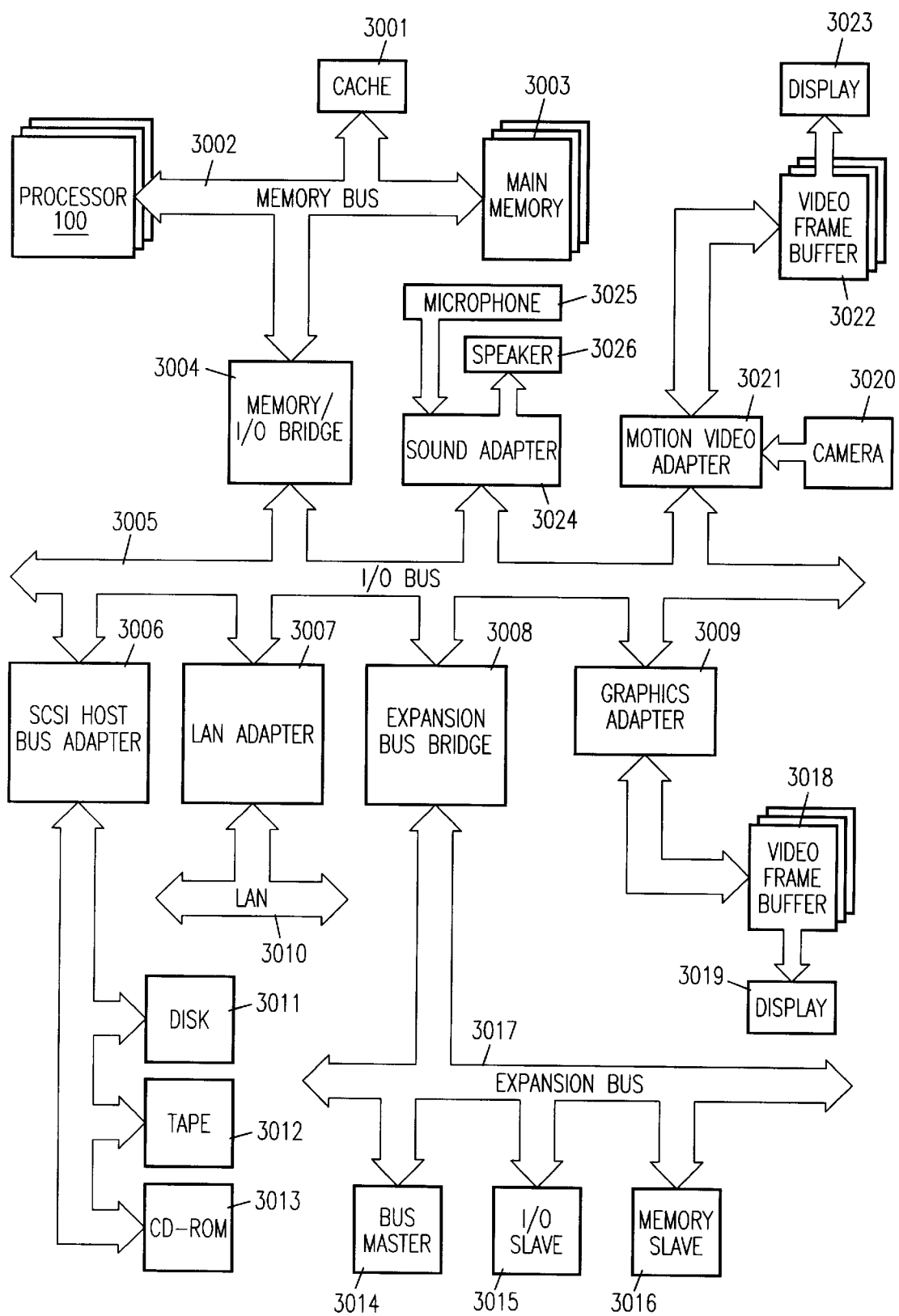
FIG. 7 is a block diagram of a multimedia computer incorporating a processor which includes a self modifying code handling system in accordance with an embodiment of the present invention.

Superscalar processor 100 may be incorporated into a wide variety of system configurations, illustratively into standalone and networked personal computer systems, workstation systems, multimedia systems, network server systems, multiprocessor systems, embedded systems, integrated telephony systems, video conferencing systems, etc. FIGS. 5–7 depict an illustrative set of suitable system configurations for a processor, such as superscalar processor 100, that includes a self modifying code handling system. In particular, FIGS. 5–7 depict suitable combinations of a superscalar processor which includes a self modifying code handling system (hereinafter, superscalar processor 100) with suitable, bus configurations, memory hierarchies and cache configurations, input/output (I/O) interfaces, controllers, devices, and peripheral components.

The set of system configurations depicted in FIGS. 5–7 is merely illustrative and alternate combinations of bus configurations, memory hierarchies, I/O interfaces, controllers, devices, and peripheral components are also suitable. For example, suitable configurations for a system incorporating superscalar processor 100 include combinations of components, cards, interfaces, and devices such as:

1. video display devices, monitors, flat-panel displays, and touch screens;
2. pointing devices and keyboards;
3. coprocessors, floating point processors, graphics processors, I/O controllers, and UARTs;
4. secondary and tertiary storage devices, controllers, and interfaces, caches, RAM, ROM, flash memory, static RAM, dynamic RAM
5. CD-ROMs, fixed disks, removable media storage devices, floppy disks, WORMs, IDE controllers, enhanced-IDE controllers, SCSI devices, scanners and jukeboxes;
6. PCMCIA interfaces and devices, ISA busses and devices, EISA busses and devices, PCI local busses and devices, VESA local busses and devices, Micro Channel Architecture busses and devices;
7. network interfaces, adapters and cards such as for Ethernet, token ring, 10Base-T, twisted pairs, untwisted pairs, ATM networks, frame-relay, ISDN, etc.;
8. video cards and devices, 2-D and 3-D graphics cards, frame buffers, MPEG/JPEG compression/decompression logic and devices, videoconferencing cards and devices, and video cameras and frame capture devices;
9. computer integrated telephony cards and devices, modem cards and devices, fax cards and devices;
10. sound cards and devices, audio and video input devices, microphones, and speakers;
11. data acquisition and control cards and interfaces, compression/decompression logic and devices, encryption/decryption logic and devices; and
12. tape backup units, redundant/fault tolerant components and devices such as RAID and ECC memory.

Suitable combinations of such components, cards, interfaces, and devices (including those enumerated above as well as comparable components, cards, interfaces, and devices) are too numerous to list. However, those skilled in the art will appreciate the full set of suitable combinations and will recognize suitable couplings between such components, cards, interfaces, and devices. FIGS. 5–7 are illustrative of an exemplary subset of the full set of suitable combinations.

A networked personal computer incorporating superscalar processor 100 is shown in FIG. 5. Superscalar processor 100 is coupled to memory subsystem 1020. In the embodiment of FIG. 5, memory subsystem 1020 is shown as RAM, although alternative embodiments include a cache or caches interposed between the RAM and superscalar processor 100. Control logic and storage for such a cache may be distributed among the memory subsystem 1020 and the superscalar processor 100. For example, the level 1 caches (i.e., instruction cache 130 and data cache 170) and cache control logic 160 may be included in superscalar processor 100 as shown in FIG. 1 and the level 2 cache may be included as part of memory subsystem 1020. Alternative distributions are also suitable, although the level 1 caches are preferably on-chip with the out-of-order execution engine 150 (see FIG. 1) of superscalar processor 100.

In the embodiment of FIG. 5, superscalar processor 100 and memory subsystem 1020 are included as parts of motherboard 1033. A series of adapters, interfaces and controllers couple the processor to devices and peripheral components. These adapters, interfaces and controllers are typically be coupled to the processor as cards in a backplane bus of motherboard 1033. However, alternative embodiments may incorporate individual adapters, interfaces and controllers into motherboard 1033. For example, graphics adapter 1010 may be included on motherboard 1033 with superscalar processor 100. In either case, graphics 1010 adapter is coupled to superscalar processor 100 via busses such as those described below with reference to FIGS. 6 and 7. Graphics adapter 1010 drives signals to control display 1001 in accordance with screen updates supplied by superscalar processor 100. Parallel interface 1009 and serial interface 1008 provide parallel port and serial port signaling interfaces for respectively interfacing to parallel port devices (e.g., printers such as parallel printer 1002, tape backup units, etc.) and to serial devices (e.g., modem 1003, pointing devices, and printers). In the embodiment of FIG. 5, parallel interface 1009 and serial interface 1008 are shown as separate interfaces although each is often incorporated with a hard disk/floppy disk controller (such as 1030) as a multifunction card. Hard disk/floppy disk controller 1030 controls access to the media of hard disk 1032 and to floppy disk 1031. Typically, hard disk/floppy disk controllers such as hard disk/floppy disk controller 1030 provide some level of buffering of reads and writes. Hard disk/floppy disk controller 1030 may also provide limited caching for data transfers to and from the disk media.

Suitable designs for graphics adapter 1010, parallel interface 1009, serial interface 1008, and hard disk/floppy disk controller 1030 are well known in the art. For example, implementations of graphics adapter cards conforming to the VGA standard are commonly available and suitable designs are well known to those skilled in the art. Designs for parallel and serial interfaces, such as those conforming to the Centronics parallel interface and to the RS-232C serial interface specifications, respectively, are also well known to those skilled in the art. Similarly, designs for IDE and SCSI disk controllers are well known in the art and suitable implementations are commonly available. In each case, graphics adapter 1010, parallel interface 1009, serial interface 1008, and hard disk/floppy disk controller 1030 are of any such suitable design.

Finally, LAN adapter 1007 provides a network interface to local area networks such as 802.3 Ethernet, 10base-T, twisted pair, and token ring networks. As with the other adapters and interfaces, LAN adapter 1007 is typically coupled to the processor as a card in the backplane bus of motherboard 1033. However, alternative embodiments may incorporate LAN adapter 1007 into motherboard 1033. Suitable cards and devices providing network interfaces are well known in the art and LAN adapter 1007 is any such suitable card or device.

Because of the high performance associated with its superscalar design, superscalar processor 100 is particularly attractive as the processor, or a one of multiple processors, in a network server configuration such as than shown in FIG.

6. In the network server configuration of FIG. 6, multiple instances of superscalar processor 100 are shown coupled to a level 2 cache 2001 and to a processor bus 2027. In the embodiment FIG. 6, superscalar processor 100 includes an on-board level 1 cache (i.e., instruction cache 130 and data cache 170) and level 2 cache control logic. The level 2 cache control logic (not shown) is coupled to level 2 cache 2001 via a 64-bit cache bus. Alternate embodiments of superscalar processor 100, such as the embodiment of FIG. 1, may offload the functionality of level 2 cache control logic. In such an alternative embodiment, level 2 cache control logic may be interposed between superscalar processor 100 and level 2 cache 2001. In the context of bus structures presented in FIG. 6, level 2 cache control logic could be coupled to superscalar processor 100 via processor bus 2027. Suitable modifications to the level 2 cache configuration of FIG. 6 will be apparent to those skilled in the art.

Referring again to FIG. 6, superscalar processor 100 is coupled to a memory controller 2002 and to a system controller 2005 via a 64-bit processor bus 2027. Memory controller 2002 provides a 64-bit interface to memory 2003 including an 8-bit parity interface to support Error Correcting Codes (ECC). ECC memory is desirable, but optional, and alternative embodiments may forgo the parity interface. System controller 2005 provides the interface (or bridge) between the 64-bit processor bus 2027 and the 32-bit local bus 2009. Local bus 2009 is any high-speed I/O bus, for example, a VESA Local bus (VL bus) or Peripheral Component Interconnect (PCI) bus. System controller 2005 provides buffering to support the potentially disparate clock rates of processor bus 2027 and local bus 2009. System controller 2005 arbitrates for use of the two busses (2027 and 2009) and may, in certain configurations, support burst data transactions across the two busses. Suitable designs for interbus bridges, such as system controller 2005 (bridging processor bus 2027 and local bus 2009) and bridge and peripheral controller 2006 (bridging local bus 2009 and ISA bus 2010, as described below) are well known in the art. For example, U.S. Pat. No. 5,414,820, "Crossing Transfers for Maximizing the Effective Bandwith of a Dual-Bus Architecture," to McFarland et al., the entirety of which is incorporated herein by reference, describes a design suitable for bridging a high-speed system bus and a slower I/O bus. System controller 2005 and bridge and peripheral controller 2006 are of any such suitable design.

Local bus 2009 couples to multiple local bus devices and components (illustratively, to IDE controller 2008, SCSI Adapter 2018, LAN Adapter 2019, and bridge and peripheral controller 2006). Certain of the local bus devices and components on local bus 2009 may optionally be provided as cards coupled to the local bus 2009 by a modular connector. In the embodiment of FIG. 6, IDE controller 2008, SCSI adapter 2018, and LAN adapter 2019 are provided as cards coupled to the local bus 2009 by a modular connector. Bridge and peripheral controller 2006 is directly connected to the local bus 2009. Alternate configurations (including configurations in which one or more of the IDE controller 2008, SCSI adapter 2018, and LAN adapter 2019 are directly connected to local bus 2009) are also suitable and will be appreciated by those skilled in the art. In addition, alternative embodiments may couple a display adapter to local bus 2009 thereby taking advantage of the generally higher bandwidth and throughput of local bus 2009 for screen updates (when compared to alternatives such as ISA, EISA, and Micro Channel Architecture busses). Because display device requirements are typically less demanding in network server configurations than in personal computer or workstation configurations, display adapter 2020 is shown coupled to the lower bandwidth ISA bus 2010.

IDE controller 2008 is representative of a variety of controller designs (including IDE, enhanced IDE, ATA, and Enhanced Small Device Interface (ESDI) controller designs) for interfacing storage devices such as disks, tape drives, and CD-ROMs. IDE controller 2008 is coupled to two disks (hard disk 2011 and floppy disk 2012) and to a tape backup unit 2013. Alternative configurations may interface an IDE/enhanced IDE CD-ROM via IDE controller 2008, although a both a CD-ROM 2015 and a CD jukebox 2017 are interfaced via a Small Computer System Interface (SCSI) adapter 2018 in the embodiment of FIG. 6. Suitable designs for hard disks, floppy disks, CD-ROMs, and tape drives are all well known in the art and modular components based on those designs are commonly available for IDE, enhanced IDE, and ATA based controller designs. IDE controller 2008 is of any such suitable design, including enhanced IDE, ATA, and ESDI alternatives.

SCSI adapter 2018 is coupled to local bus 2009 and to multiple SCSI devices (illustratively, to a Redundant Array of Inexpensive Disks (RAID) 2014, CD-ROM 2015, scanner 2016, and CD jukebox 2017) in a daisy chain configuration. For illustrative purposes, the daisy chain of SCSI devices is shown as a bus in FIG. 6. Additional SCSI devices may also be coupled to SCSI adapter 2018 and additional SCSI adapters may be coupled to local bus 2009 to provide even larger numbers of SCSI device connections. Additionally, SCSI adapter 2018 and/or additional SCSI adapters may be coupled to an Industry Standard Architecture (ISA) bus such as ISA bus 2010, although coupling to a local bus such as local bus 2009 is generally preferable because of the higher bandwidth and throughput of local busses conforming to standards such as the VL bus or PCI standards.

In addition to the set of SCSI devices shown in FIG. 6, additional hard disks printers, LAN adapters and other computer systems may be coupled to superscalar processor 100 via a SCSI adapter such as SCSI adapter 2018. Additionally, SCSI adapter 2018 is representative of suitable alternative device adapters such as SCSI-2 and ESDI adapters. Suitable designs for RAIDs, scanners, CD-ROM jukeboxes, hard disks, CD-ROMs, printers, LAN adapters and tape drives are all well known in the art and modular components based on those designs are commonly available for SCSI adapter designs. SCSI adapter 2018 is of any such suitable design, including SCSI-2 and ESDI alternatives.

LAN adapter 2019 is coupled to local bus 2009 and, in the embodiment of FIG. 6, provides support for an IEEE 802.3 Carrier Sense Multiple Access with Collision Detection (CSMA/CD) local area network, although adapters for alternative network configurations and for media variations of an 802.3 network are also suitable. LAN adapter 2019 is therefore representative of suitable alternative device adapters such as those based on IEEE 802.x standards (e.g., 802.3 baseband Ethernet on coaxial media, twisted and untwisted pair media, and 10base-T, 802.3 broadband networks, 802.4 token passing networks, 802.5 token ring networks, etc.), and those based on Fiber Distributed Data Interface (FDDI) standards. Designs for such suitable network adapters are well known in the art and modular components based on those designs are commonly available for both VL bus and PCI bus connections. In addition, suitable designs for network adapters with ISA, SCSI, and SCSI-2 interfaces are also are well known in the art and modular components based on those designs are also commonly available. Alternative embodiments may therefore incorporate LAN adapters such as LAN adapter 2019 coupled to superscalar processor 100 via ISA bus 2010 or SCSI adapter 2018, although coupling to a local bus such as local bus 2009 is generally preferable to the ISA bus alternative because of the higher bandwidth and throughput of local busses conforming to standards such as the VL bus or PCI standards. LAN adapter 2019 is of any suitable design, for any suitable network topology and medium, and is coupled to any of the suitable bus structures (e.g., VL bus, PCI bus, ISA bus, SCSI, etc.).

ISA bus 2010 is coupled to local bus 2009 via bridge and peripheral controller 2006. Suitable bridges, like system controller 2005 bridge, are well known in the art and bridge and peripheral controller 2006 is of any suitable design. ISA bus 2010 provides a lower-speed (when compared to local bus 2009), 16-bit I/O bus and provides modular connections for a variety of peripheral components including display adapter 2020, telephony card 2026, and a multifunction I/O card such as super I/O 2028. Display adapters such as display adapter 2020 are well known in the art and provide varying degrees of support for advanced graphics functions. For example, simple text display adapters provide text and character based graphics only. More sophisticated display adapters, such as those implementing SVGA, XGA, VESA, CGA, and Hercules graphics standards provide multibit color and higher display resolutions. Specialized display adapters may provide more advanced features, such as hardware support for 24-bit color, 3-D graphics, hidden surface removal, lighting models, Gouraud shading, depth queuing, and texture mapping. As described above, display device requirements have typically been less demanding in network server configurations than in personal computer or workstation configurations. As a result, display adapter 2020 is shown coupled to the relatively low bandwidth ISA bus 2010. However, alternative embodiments may couple an advanced or specialized display adapter to local bus 2009 thereby taking advantage of the generally higher bandwidth and throughput of local bus 2009 for screen updates (when compared to alternatives such as ISA, EISA, and Micro Channel Architecture busses).

Super I/O 2028 provides support for a serial port 2022, a parallel port 2023, a pointing device 2024, and a disk 2025. Suitable designs for combination ISA cards such as super I/O 2028 are well known in the art and such cards are commonly available. Super I/O 2028 is of any such suitable design. Modems may be coupled via serial port 2022 and printers may be coupled via either the serial port 2022 or parallel port 2023 provided by super I/O 2028. Alternatively, a single function ISA card may be used for such purposes. Modem and fax/modem cards are one example of such a single function card. Telephony card 2026 is representative of cards providing voice, fax, and speech recognition, modem, fax-on-demand services, etc. Suitable telephony cards typically conform to standards defining a modular architecture for integrating computer-based application with telephony hardware. These standards include the Communicating Applications Specification (CAS) and the more comprehensive Signal Computing System Architecture (SCSA) standard. Telephony card 2026 is of any such suitable design.

Preferably, a high performance server configuration, such as that shown in FIG. 6, includes a hierarchy of busses with varying performance characteristics each matched to the devices and components coupled thereto. Those skilled in the art will recognize a variety of suitable variations on the bus hierarchy of FIG. 6, including the elimination of individual busses, the addition of multiple instances of individual busses, and redistribution of devices and components among the various busses. The server configuration of FIG. 6 is representative of all such suitable variations.

A multimedia workstation configuration for superscalar processor 100 shown in FIG. 7. As with the server configuration of FIG. 6, the multimedia workstation configuration includes a hierarchy of busses with varying performance characteristics each matched to the devices and components coupled thereto. Those skilled in the art will recognize a variety of suitable variations on the bus hierarchy of FIG. 7. Memory bus 3002 couples superscalar processor 100, cache 3001, memory 3003, and bridge 3004. As with the network server configuration of FIG. 6, a variety of cache configurations are suitable for a multimedia workstation. In the embodiment FIG. 7, superscalar processor 100 includes an on-board level 1 cache (i.e., the instruction cache 130 and data cache 170 of FIG. 1). A level 2 cache (i.e., cache 3001) including control logic is coupled to superscalar processor 100 via memory bus 3002. Alternate embodiments of superscalar processor 100, may incorporate functionality of level 2 cache control logic thereby enabling a direct connection to level 2 cache storage. Furthermore, alternative embodiments may relocate all cache support to cache 3001, although at least a level 1 cache is preferably on-chip with the out-of-order execution engine 150 (see FIG. 1) of superscalar processor 100. Suitable modifications to the cache configuration of FIG. 6 will be apparent to those skilled in the art.

I/O bus 3005 is comparable to local bus 2009 of FIG. 6 and is preferably a high speed I/O bus such as a VL bus or PCI bus. SCSI adapter 3006, LAN adapter expansion bus bridge 3008, graphics adapter 3009, sound adapter 3024, and motion video adapter 3021 are coupled to each other and to superscalar processor 100 via I/O bus 3005. SCSI adapter 3006, LAN adapter 3007, and expansion bus bridge 3008, together with the components and devices coupled to each are comparable to corresponding adapters, components, and devices discussed above with reference to FIG. 6.

In particular, SCSI adapter 3006 is coupled to multiple SCSI devices (illustratively, disk 3011, tape backup unit 3012, and CD-ROM 3013) in a daisy chain configuration. For illustrative purposes, the daisy chain of SCSI devices is shown as a bus. Additional SCSI devices may also be coupled to SCSI adapter 3006. Suitable designs for SCSI adapter 3006 are discussed above with reference to the comparable SCSI adapter 2018 of FIG. 6. Variations on the set of SCSI devices, and on SCSI configurations in general (each of which has been described above with reference to FIG. 6) are also applicable in the multimedia workstation configuration of FIG. 7. Similarly, suitable designs and variations on LAN adapter 3007 are also described above in the context of the comparable LAN adapter 2019 (see FIG. 6). Furthermore, suitable designs and variations on expansion bus 3017 are described above in the context of the comparable ISA bus 2010 (see FIG. 6). As described above, suitable designs for SCSI adapter 2018 and ISA bus 2010 are well known in the art and modular components based on such suitable designs are commonly available. SCSI adapter 3006, LAN adapter 3007, and expansion bus 3017 (together with the components and devices coupled thereto) are comparable. SCSI adapter 3006, LAN adapter 3007, expansion bus bridge 3008, and expansion bus 3017 are therefore also of any such suitable designs.

As shown above in FIG. 1, out-of-order execution engine 150 of superscalar processor 100 includes a multimedia unit 157 for executing multimedia extensions to the x86 instruction set. Referring again to FIG. 7, multimedia adapters, such as sound adapter 3024, motion video adapter 3021, and graphics adapter 3009, are each coupled to superscalar processor 100 via I/O bus 3005 and memory bus 3002 to provide for high-bandwidth transfers of multimedia data between the multimedia adapters, memory 3003, and secondary storage devices (e.g., disk 3011). Sound adapter 3024 provides digital-to-analog (D/A) and analog-to-digital (A/D) interfaces for respectively synthesizing and sampling audio signals. The D/A and A/D interfaces of sound adapter 3024 are respectively coupled to an audio performance device, such as a speaker 3026, and an audio signal acquisition device, such as a microphone 3025. Other suitable audio performance devices include mixing consoles, signal processing devices, synthesizers, MIDI sequencers and power amplifiers. Other suitable audio signal acquisition devices include signal processing devices and digital samplers. Suitable designs for sound cards are well known in the art and sound adapter 3024 is of any such suitable design.

Motion video adapter 3021 provides support for capture and compression of video signals, for example, from video camera 3020. In addition, motion video adapter 3021 supplies a display device 3023 such as a television, high-definition television, or a high resolution computer monitor with display signals via a frame buffer 3022. Alternative embodiments of motion video adapter 3021 may eliminate the frame buffer 3022 and directly drive a raster display. Furthermore, alternative embodiments of motion video adapter 3021 may decouple the video input and video output functionality of motion video adapter 3021, and instead provide separate video input and video output components.

Because video information requires large amounts of storage space, it is generally compressed. Accordingly, to display compressed video information, for example from data represented on a compact disk in CD-ROM 3013, the compressed video information must be decompressed. High bandwidth burst mode data transfers are supported by I/O bus 3005, which is preferably a local bus such as PCI with support for arbitrary length burst data transfers. In the multimedia workstation configuration of FIG. 7, video compression and decompression can be performed by superscalar processor 100 (executing multimedia instructions in multimedia unit 157) and/or by motion video adapter 3021. Thus, memory bus 3002 and bridge 3004 preferably support burst data transfers across the bridge (3004) between memory bus 3002 and I/O bus 3005. Suitable designs for motion video adapters typically provide support for the Moving Pictures Expert Group (MPEG) standards for video encoding and decoding (e.g., MPEG-1 and MPEG-2) and for JPEG. In addition, motion video adapter 3021 may support video conferencing by providing implementing video compression/decompression algorithms in accordance with H.261 (the standard compression algorithm for H.320 videoconferencing). Suitable designs for implementing such compression/decompression algorithms are well known in the art and motion video adapter 3021 is of any such suitable design.

Graphics adapters such as graphics adapter 3009 are well known in the art and provide varying degrees of support for advanced graphics functions. For example, graphics adapters, such as those implementing SVGA, XGA, VESA, CGA, and Hercules graphics standards provide multibit color and higher display resolutions. Specialized display adapters may provide more advanced features, such as hardware support for 24-bit color, 3-D graphics, hidden surface removal, lighting models, Gouraud shading, depth queuing, and texture mapping. Suitable designs for graphics adapters are well known in the art and modular components based on these designs are commonly available. Graphics adapter 3009 is of any such suitable design. Alternative embodiments my combine the graphics display functionality of graphics adapter 3009 with the motion video display functionality of motion video adapter 3021 outputting on a single high-resolution display device.

While the invention has been described with reference to various embodiments, it will be understood that these embodiments are illustrative and that the scope of the invention is not limited to them. Many variations, modifications, additions, and improvements of the embodiments described are possible. For example, the organization of Op entries in scheduler 180 as Op quads is merely illustrative. Alternative embodiments may incorporate other structures and/or methods for representing the nature and state of operations in a computer having multiple and/or pipelined execution units. Furthermore, alternative embodiments may incorporate different hierarchies of memories and caches, for example L1 and L2 caches. In such alternative embodiments, store acknowledgments may be provided by an L2 cache.

Alternative embodiments may provide for a different distribution of structures and functionality, including structures for tag representation and comparison, among the scheduler 180, the store unit 153, the store queue 159, and the instruction decoder 140. Additionally, structures and functionality presented as hardware in the exemplary embodiment may be implemented as software, firmware, or microcode in alternative embodiments. These and other variations, modifications, additions, and improvements may fall within the scope of the invention as defined in the claims which follow.

CROSS-REFERENCE

The present invention is related to subject matter disclosed in the following patent applications:

1. U.S. patent application Ser. No. 08/592,207, now abandoned, entitled, "Instruction Predecode and Multiple Instruction Decode," naming John G. Favor and Amos Ben-Meir as inventors and filed on Jan. 26, 1996;
2. U.S. patent application Ser. No. 08/593,765, now abandoned, entitled, "Instruction Buffer Organization Method and System," naming John G. Favor as inventor and filed on;
3. U.S. Pat. No. 5,754,812;
4. U.S. patent application Ser. No. 08/590,568, entitled "Out-of-Order Processing With Operation Bumping to Reduce Pipeline Delay," naming John G. Favor and Amos Ben-Meir as inventors and filed on Jan. 26, 1996;
5. U.S. Pat. No. 5,745,724;
6. U.S. patent application Ser. No. 08/592,210, now abandoned, entitled, "Instruction Decoder Including Two-Way Emulation Code Branching," naming John G. Favor as inventor and filed on Jan. 26, 1996;
7. U.S. patent application Ser. No. 08/592,208, now abandoned, entitled, "Instruction Decoder Including Emulation Using Indirect Specifiers," naming John G. Favor as inventor and filed on Jan. 26, 1996;
8. U.S. patent application Ser. No. 08/592,151, now abandoned, entitled, "RISC 86 Instruction Set," naming John G. Favor as inventor and filed on Jan. 26, 1996, and
9. U.S. patent application Ser. No. 08/592,149, entitled, "Flexible Implementation of a System Management Mode (SMM) in a Processor," naming John G. Favor and Frederick D. Weber as inventors and filed on Jan. 26, 1996;

10. U.S. patent application Ser. No. 08/592,041, entitled, "Design for a Simulation Module Using an Object-Oriented Programming Language," naming Warren G. Stapleton as inventor and filed on Jan. 26, 1996;

11. U.S. patent application Ser. No. 08/592,828, entitled, "Method for Analyzing The Performance of a Microprocessor," naming Warren G. Stapleton as inventor and filed on Jan. 26, 1996;

12. U.S. patent application Ser. No. 08/592,829, entitled, "Method for Simulating Cache Operation," naming Warren G. Stapleton as inventor and filed on Jan. 26, 1996;

13. U.S. patent application Ser. No. 08/590,383, entitled, "Unified Multi-Function Operation Scheduler for Out-Of-Order Execution In A Superscalar Processor" naming John G. Favor, Amos Ben Meir and Warren G. Stapleton as inventors and filed on Jan. 26, 1996;

each of which is incorporated herein by reference, in its entirety.

What is claimed is:

1. A network server computer system incorporating a superscalar processor including a self modifying code handling system, the network server computer system comprising:
   a superscalar processor having operation entries for representing operations in stages from instruction fetch to result commitment, a store pipe for committing store operands to target addresses in memory, and a self-modifying code handling system comprising:
      a plurality of first tag stores respectively associated with a first group of the operation entries, the first tag stores representing first addresses in memory of instructions corresponding to the associated operation entries;
      first comparison logic coupled to the first tag stores and to the store pipe, the first comparison logic supplying a self-modifying code indication in response to a match between the target address for a store operation being committed by the store pipe and any of the first addresses represented in the first tag stores; and
      control logic coupled to the first comparison logic and to the operation entries, the control logic flushing uncommitted ones of the operation entries in response to the self-modifying code indication;
   a memory coupled to the superscalar processor via a processor bus;
   a local bus and an input/output bus;
   first and second bridges, respectively coupling the processor bus to the local bus and the local bus to the input/output bus; and
   a local area network (LAN) adapter coupled to one of the local bus and the input/output bus.

2. A network server, as recited in claim 1, further comprising:
   a data storage device coupled to one of the local bus and the input/output bus.

3. A network server, as recited in claim 2, wherein the storage device comprises a hard disk.

4. A network server, as recited in claim 3, wherein the hard disk is selected from the group consisting of an IDE disk, an enhanced IDE disk, an ATA disk, an ESDI disk, and a SCSI disk.

5. A network server, as recited in claim 2, wherein the storage device comprises a tape unit.

6. A network server, as recited in claim 5, wherein the tape unit is selected from the group consisting of an IDE tape unit, an enhanced IDE tape unit, an ATA tape unit, an ESDI tape unit, and a SCSI tape unit.

7. A network server, as recited in claim 2, wherein the storage device comprises a CD-ROM.

8. A network server, as recited in claim 7, wherein the CD-ROM is selected from the group consisting of an IDE CD-ROM, an enhanced IDE CD-ROM, an ATA CD-ROM, an ESDI CD-ROM, and a SCSI CD-ROM.

9. A network server, as recited in claim 2, wherein the storage device comprises a jukebox.

10. A network server, as recited in claim 2, wherein the storage device comprises a RAID.

11. A network server, as recited in claim 2, wherein the storage device comprises a flash memory.

12. A network server, as recited in claim 1, further comprising:
   a communications device coupled to one of the local bus and the input/output bus.

13. A network server, as recited in claim 12, wherein the communications device comprises one of a modem, a faxmodem, and an integrated telephony device.

14. A network server, as recited in claim 13, wherein the communications device flirter comprises a printed circuit card coupled to one of the local bus and the input/output bus via a modular connector.

15. A network server, as recited in claim 13, wherein the communications device is coupled to one of the local bus and the input/output bus via a serial interface.

16. A network server, as recited in claim 1, further comprising:
   an input/output device coupled to one of the local bus and the input/output bus.

17. A network server, as recited in claim 16, wherein the input/output device is selected from the group consisting of a text display adapter, a graphics adapter, a 3-D graphics adapter, a SVGA display adapter, an XGA adapter, a display adapter supporting VESA graphics standards, a CGA adapter, an adapter supporting Hercules graphics standards.

18. A network server, as recited in claim 16, wherein the input/output device is selected from the group consisting of a pointing device, a mouse, a trackball, and a keyboard.

19. A network server, as recited in claim 1, wherein the LAN adapter is selected from the group consisting of a baseband network LAN adapter, a broadband network LAN adapter, a token passing network LAN adapter, a token ring network LAN adapter, a 10base-T network LAN adapter, and an ethernet LAN adapter.

20. A network server, as recited in claim 1, wherein the local bus comprises a VL bus.

21. A network server, as recited in claim 1, wherein the local bus comprises a PCI bus.

22. A network server, as recited in claim 1, wherein the input/output bus is selected from the group consisting of an ISA bus, an EISA bus, a Micro Channel Architecture Bus, and a local bus.

23. In a computer having operation entries for representing operations in stages from instruction fetch to result commitment and having a store pipe for committing store operands to target addresses in memory, a self-modifying code handling system comprising:
   a plurality of first tag stores respectively associated with a first group of the operation entries, the first tag stores representing first addresses in memory of instructions corresponding to the associated operation entries;
   first comparison logic coupled to the first tag stores and to the store pipe, the first comparison logic supplying a self-modifying code indication in response to a match between the target address for a store operation being committed by the store pipe and any of the first addresses represented in the first tag stores; and control logic coupled to the first comparison logic and to the operation entries, the control logic flushing uncommitted ones of the operation entries in response to the self-modifying code indication.

24. A self-modifying code handling system, as recited in claim 23:

wherein the first group of operation entries comprises a plurality of Op entries organized in Op groups represented in a scheduler, and wherein the first tag stores each include a pair of tag fields covering memory addresses for a group of instructions from which the Op entries of the associated Op group decode, tag field pairs covering memory addresses on either side of a cache line boundary when the group of instructions crosses the cache line boundary.

25. A self-modifying code handling system, as recited in claim 24, further comprising:

an address store coupled to the store pipe to receive the target address for successive store operations, the address store being cleared in response to a store acknowledgment from a memory subsystem; and fetch control logic coupled to the address store, the fetch control logic nullifying an instruction fetch from a current fetch address in response to a match between the current fetch address and the target address stored in the address store.

26. A self-modifying code handling system, as recited in claim 25, further comprising:

an instruction cache coupled between the instruction decoder and the memory subsystem; and a data cache coupled between the store pipe and the memory subsystem; and instruction/data cache control logic for preventing a cache line from simultaneously residing in both the instruction cache and the data cache.

27. A self-modifying code handling system, as recited in claim 26, wherein the instruction cache inhibits processing of fetches from the instruction decoder while processing a snoop from the memory subsystem.

28. A self-modifying code handling system, as recited in claim 24, wherein the first addresses represented in the pair of tag field are partial addresses, and wherein the first comparison logic supplies the self-modifying code indication in response to a match between any of the partial addresses represented in the tag fields and a corresponding portion of the target address for the store operation being committed by the store pipe.

29. A self-modifying code handling system, as recited in claim 28, wherein the partial addresses represented in the tag fields and the corresponding portion of the target address for the store operation being committed by the store pipe each include bits 5–19 of the respective addresses.

30. A self-modifying code handling system, as recited in claim 24, wherein the Op entries are organized as Op quads.

31. A self-modifying code handling system, as recited in claim 23, wherein the first group and a second group of the operation entries are respectively associated with a scheduler and with an instruction decoder, the self-modifying code handling system further comprising:

a plurality of second tag stores respectively associated with ones of the second group of operation entries, the second tag stores representing second addresses in memory of instructions corresponding to the associated operation entries;

second comparison logic coupled to the second tag stores, to the store pipe, and to the control logic, the second comparison logic supplying the self-modifying code indication in response to a match between the target address for the store operation being committed by the store pipe and any of the addresses represented in the second tag stores;

wherein the control logic flushes the second group of operation entries and uncommitted ones of the first group of operation entries in response to the self-modifying code indication.

32. A self-modifying code handling system, as recited in claim 31:

wherein the first group of operation entries comprises a plurality of Op entries organized in Op groups represented in a scheduler, wherein the first tag stores each include a pair of tag fields covering memory addresses for a group of instructions from which the Op entries of the associated Op group decode, tag field pairs covering memory addresses on either side of a cache line boundary when the group of instructions crosses the cache line boundary;

wherein the second group of operation entries comprises a plurality of instruction entries organized as an instruction buffer in the instruction decoder, each instruction buffer entry corresponding to a cache line; and wherein the second addresses cover the cache line.

33. A self-modifying code handling system, as recited in claim 32, wherein the first and second addresses are partial addresses, wherein the first comparison logic supplies the self-modifying code indication in response to a match between any of the partial addresses represented in the tag fields and a corresponding portion of the target address, and wherein the second comparison logic supplies the self-modifying code indication in response to a match between any of the partial addresses represented in the second tag stores and a corresponding portion of the target address.

34. A self-modifying code handling system, as recited in claim 33, wherein the partial addresses include bits 5–19 of respective full addresses.

35. A self-modifying code handling system, as recited in claim 32, wherein the Op entries are organized as Op quads.

36. A multimedia computer system incorporating a processor including a self modifying code handling system, the multimedia computer system comprising:

a multimedia performance device;

a multimedia adapter coupled to the multimedia performance device and coupled to the multimedia signal acquisition device, the multimedia adapter including a signal conversion interface for synthesizing and sampling multimedia signals;

an input/output bus coupled to the multimedia adapter for communicating transfers of multimedia data; and a superscalar processor coupled to the input/output bus for processing multimedia data and controlling communication of multimedia data between the superscalar processor and the multimedia adapter, the superscalar processor having operation entries for representing operations in stages from instruction fetch to result commitment, a store pipe for committing store operands to target addresses in memory, and a self-modifying code handling system comprising:

a plurality of first tag stores respectively associated with a first group of the operation entries, the first tag stores representing first addresses in memory of instructions corresponding to the associated operation entries;

first comparison logic coupled to the first tag stores and to the store pipe, the first comparison logic supplying a self-modifying code indication in response to a match between the target address for a store operation being committed by the store pipe and any of the first addresses represented in the first tag stores; and control logic coupled to the first comparison logic and to the operation entries, the control logic flushing uncommitted ones of the operation entries in response to the self-modifying code indication.

37. A multimedia computer system according to claim 36 further comprising:

a multimedia signal acquisition device.

38. A multimedia computer system according to claim 37 wherein:

the multimedia performance device includes a motion video display selected from the group of televisions, high-definition televisions and high resolution computer monitors;

the multimedia signal acquisition device includes a video camera; and the multimedia adapter includes a motion video adapter.

39. A multimedia computer system according to claim 38 wherein:

the multimedia performance device includes a video frame buffer.

40. A multimedia computer system according to claim 38 wherein:

the multimedia adapter performance device includes a system for video encoding and decoding in accordance with Moving Pictures Expert Group (MPEG) standards.

41. A multimedia computer system according to claim 36 wherein:

the multimedia performance device includes an audio performance device selected from among the group of mixing consoles, signal processing devices, synthesizers, MIDI sequencers, power amplifiers and speakers; and the multimedia adapter includes an audio adapter selected from among the group of D/A interfaces and A/ID interfaces.

42. A multimedia computer system according to claim 41 further comprising:

a multimedia signal acquisition device including an audio signal acquisition device selected from among the group including microphones, signal processing devices and digital samplers.

43. A multimedia computer system according to claim 36 wherein:

the multimedia performance device includes a video frame buffer and a graphics display selected from the group of televisions, high-definition televisions and high resolution computer monitors; and the multimedia adapter includes a graphics adapter selected from the group of SVGA, XGA, VESA, CGA and Hercules graphic standard adapters.

44. A multimedia computer system according to claim 36 further comprising:

an SCSI adapter coupled to the input/output bus; and a read/write storage media coupled to the SCSI adapter for storing and accessing data including multimedia data.

45. A multimedia computer system according to claim 44 wherein the read/write storage media include media selected from among the group of magnetic disk drives, magnetic tape drives and CD-ROM drives.

46. A multimedia computer system according to claim 36 further comprising:

a local area network (LAN) adapter coupled to the input/output bus.

47. An apparatus comprising:

a memory subsystem;

instruction and data caches coupled to the memory subsystem;

a plurality of execution units including a store pipe coupled to the data cache to commit results of a (Store Op) to the memory subsystem, the store pipe supplying a StOp target address indication on commitment of a StOp result;

a scheduler including an ordered plurality of Op entries for Ops decoded from instructions and a corresponding plurality of first address tags covering memory addresses for the instructions;

first comparison logic coupled to the store pipe and to the first address tags, the first comparison logic coupled to trigger self-modifying code fault handling means in response to a match between the StOp target address and a one of the first address tags;

an instruction decoder coupled between the instruction cache and the scheduler, the instruction decoder including a plurality of instruction buffer entries and second address tags associated with the instruction buffer entries; and second comparison logic coupled to the store pipe and to the second address tags, the second comparison logic coupled to trigger the self-modifying code fault handling means in response to a match between the StOp target address and a one of the second address tags.

48. An apparatus, as recited in claim 47, wherein the self-modifying code fault handling means comprises:

control logic coupled to the first and second comparison logic and to the scheduler and instruction decoder, the control logic flushing uncommitted ones of the Op from the Op entries and flushing instructions from the instruction buffer in response to a self-modifying code fault indication from either first or second comparison logic.

49. An apparatus, as recited in claim 48, wherein the self-modifying code fault handling means further comprises a self-modifying code fault handler performing the following steps:

committing those Ops associated with the same instruction as the triggering StOp;

obtaining an instruction pointer for the triggering StOp;

waiting until the triggering StOp is acknowledged by the memory subsystem; and jumping back in the instruction stream to an instruction immediately following the instruction associated with the triggering StOp.

50. An apparatus, as recited in claim 48, wherein the self-modifying code fault handling means further comprises:

an address store coupled to the store pipe to receive the target address for successive StOps, the address store being cleared in response to a StOp acknowledgment from the memory subsystem; and fetch control logic coupled to the address store, the fetch control logic nullifying an instruction fetch from a fetch address by the instruction decoder in response to a match between the fetch address and the target address stored in the address store.

51. A self-modifying code handling system, as recited in claim 48, further comprising:

instruction/data cache control logic for preventing a cache line from simultaneously residing in both the instruction cache and the data cache.

52. A computer system comprising:

a memory subsystem which stores data and instructions; and a processor operably coupled to access the data and instructions stored in the memory subsystem, the processor having operation entries for representing operations in stages from instruction fetch to result commitment, a store pipe for committing store operands to target addresses in memory, and a self-modifying code handling system comprising:

a plurality of first tag stores respectively associated with a first group of the operation entries, the first tag stores representing first addresses in memory of instructions corresponding to the associated operation entries;

first comparison logic coupled to the first tag stores and to the store pipe, the first comparison logic supplying a self-modifying code indication in response to a match between the target address for a store operation being committed by the store pipe and any of the first addresses represented in the first tag stores; and control logic coupled to the first comparison logic and to the operation entries, the control logic flushing uncommitted ones of the operation entries in response to the self-modifying code indication.

53. The computer system of claim 52, wherein the processor and the memory subsystem are components of a motherboard.

54. The computer system of claim 53, wherein the motherboard further comprises a backplane bus operably connected to the processor, and wherein the computer system further comprises one or more devices on cards connected to the motherboard via the backplane bus.

55. The computer system of claim 52, further comprising a parallel device interface operably coupled to the processor.

56. The computer system of claim 55, further comprising a printer connected to the processor via the parallel interface.

57. The computer system of claim 52, further comprising a serial device interface operably coupled to the processor.

58. The computer system of claim 57, further comprising a modem connected to the processor via the serial interface.

59. The computer system of claim 52, further comprising a graphics adapter operably coupled to the processor.

60. The computer system of claim 59, further comprising a video display connected to the processor via the graphics adapter.

61. The computer system of claim 52, further comprising a local area network adapter operably coupled to the processor.

62. The computer system of claim 61, further comprising a network of devices connected to the processor via the network adapter.

63. The computer system of claim 52, further comprising a disk controller operably coupled to the processor.

64. The computer system of claim 63, furter comprising a hard disk connected to the processor via the disk controller.

65. The computer system of claim 63, fther comprising a floppy disk connected to the processor via the disk controller.

66. A network server computer system incorporating a processor including a self modifying code handling system, the network server computer system comprising:

a local area network (LAN) adapter; and a superscalar processor coupled to the LAN adapter for processing data provided to and received from the LAN adapter, the superscalar processor having operation entries for representing operations in stages from instruction fetch to result commitment, a store pipe for committing store operands to target addresses in memory, and a self-modifying code handling system comprising:

a plurality of first tag stores respectively associated with a first group of the operation entries, the first tag stores representing first addresses in memory of instructions corresponding to the associated operation entries;

first comparison logic coupled to the first tag stores and to the store pipe, the first comparison logic supplying a self-modifying code indication in response to a match between the target address for a store operation being committed by the store pipe and any of the first addresses represented in the first tag stores; and control logic coupled to the first comparison logic and to the operation entries, the control logic flushing uncommitted ones of the operation entries in response to the self-modifying code indication.

67. A network server, as recited in claim 66, further comprising a hard disk coupled to the superscalar processor.

68. A network server, as recited in claim 67, wherein the hard disk is selected from the group consisting of an IDE disk, an enhanced IDE disk, an ATA disk, an ESDI disk, and a SCSI disk.

69. A network server, as recited in claim 66, further comprising a tape unit coupled to the superscalar processor.

70. A network server, as recited in claim 69, wherein the tape unit is selected from the group consisting of an IDE tape unit, an enhanced IDE tape unit, an ATA tape unit, an ESDI tape unit, and a SCSI tape unit.

71. A network server, as recited in claim 66, flirther comprising a CD-ROM coupled to the superscalar processor.

72. A network server, as recited in claim 71, wherein the CD-ROM is selected from the group consisting of an IDE CD-ROM, an enhanced IDE CD-ROM, an ATA CD-ROM, an ESDI CD-ROM, and a SCSI CD-ROM.

73. A network server, as recited in claim 66, wherein the LAN adapter is selected from the group consisting of a baseband network LAN adapter, a broadband network LAN adapter, a token passing network LAN adapter, a token ring network LAN adapter, a 10base-T network LAN adapter, and an ethernet LAN adapter.

74. A network server, as recited in claim 66, further comprising a jukebox coupled to the superscalar processor.

75. A network server, as recited in claim 66, further comprising a RAID coupled to the superscalar processor.

76. A network server, as recited in claim 66, further comprising a flash memory coupled to the superscalar processor.

77. A network server, as recited in claim 66, further comprising a modem coupled to the superscalar processor.

78. A network server, as recited in claim 66, ftirther comprising a faxmodem coupled to the superscalar processor.

79. A network server, as recited in claim 66, further comprising an integrated telephony device coupled to the superscalar processor.

80. A network server, as recited in claim 66, further comprising a display adapter coupled to the superscalar processor, the display adapter selected from the group consisting of a text display adapter, a graphics adapter, a 3-D graphics adapter, a SVGA display adapter, an XGA adapter, a display adapter supporting VESA graphics standards, a CGA adapter, an adapter supporting Hercules graphics standards.

81. A network server, as recited in claim 66, further comprising an input/output device coupled to the superscalar processor, the input/output device selected from the group consisting of a pointing device, a mouse, a trackball, and a keyboard.

82. An apparatus comprising:

a memory subsystem;

instruction and data caches coupled to the memory subsystem;

a plurality of execution units including a store pipe coupled to the data cache to commit results of a (Store Op) to a target address in the memory subsystem;

a scheduler including an ordered plurality of Op entries for Ops decoded from associated instructions, the associated instructions represented in memory at respective first instruction addresses;

means for detecting a first correspondence between the target address and the first instruction addresses, the first correspondence detecting means coupled to the store pipe and to the scheduler, the first correspondence detecting means triggering a self-modifying code fault on detection of the first correspondence;

an instruction decoder coupled between the instruction cache and the scheduler, the instruction decoder including a plurality of instruction buffer entries for instructions represented in memory at respective second instruction addresses;

means for detecting a second correspondence between the target address and the second instruction addresses, the second correspondence detecting means coupled to the store pipe and to the scheduler, the second correspondence detecting means triggering a self-modifying code fault on detection of the second correspondence.

* * * * *